United States Patent
Boss et al.

(10) Patent No.: US 8,190,642 B2
(45) Date of Patent: May 29, 2012

(54) METHOD, SYSTEM, AND STORAGE MEDIUM FOR IMPLEMENTING INTELLIGENT TEAM MANAGEMENT SERVICES

(75) Inventors: Gregory J. Boss, American Fork, UT (US); Rick A. Hamilton, II, Charlottesville, VA (US); Andrew R. Jones, Round Rock, TX (US); Kevin C. McConnell, Austin, TX (US); Alan P. Mitchell, Cedar Park, TX (US); Robert R. Wentworth, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 2057 days.

(21) Appl. No.: 10/992,572

(22) Filed: Nov. 18, 2004

(65) Prior Publication Data

US 2006/0106828 A1 May 18, 2006

(51) Int. Cl.
G06F 17/30 (2006.01)
(52) U.S. Cl. ..................................... 707/791
(58) Field of Classification Search .................. None
See application file for complete search history.

(56) References Cited

U.S. PATENT DOCUMENTS

| | | | |
|---|---|---|---|
| 6,240,415 B1 | 5/2001 | Blumberg | |
| 6,453,353 B1* | 9/2002 | Win et al. | 709/229 |
| 6,529,882 B1 | 3/2003 | Park et al. | |
| 6,671,695 B2 | 12/2003 | McFadden | |
| 6,930,598 B2* | 8/2005 | Weiss | 340/531 |
| 6,970,908 B1* | 11/2005 | Larky et al. | 709/206 |
| 7,139,801 B2* | 11/2006 | Smith et al. | 709/206 |
| 2002/0075305 A1 | 6/2002 | Beaton et al. | |
| 2002/0087646 A1* | 7/2002 | Hickey et al. | 709/206 |
| 2002/0103746 A1 | 8/2002 | Moffett, Jr. | |
| 2002/0169961 A1* | 11/2002 | Giles et al. | 713/175 |
| 2003/0110211 A1* | 6/2003 | Danon | 709/203 |
| 2003/0233364 A1* | 12/2003 | Nakao et al. | 707/100 |
| 2004/0128540 A1* | 7/2004 | Roskind | 713/201 |
| 2004/0158610 A1* | 8/2004 | Davis et al. | 709/206 |
| 2004/0210450 A1* | 10/2004 | Atencio et al. | 705/1 |

FOREIGN PATENT DOCUMENTS

WO    WO 02103570 A1    7/2003

OTHER PUBLICATIONS

Bob Temple, The Complete Idiots Guide to Micorft Outlook 2000 p. 8-9, 30-31, 47, 49, 58, 103, 105, 205.*

* cited by examiner

*Primary Examiner* — Apu Mofiz
*Assistant Examiner* — Thu Nga Nguyen
(74) *Attorney, Agent, or Firm* — Cantor Colburn LLP; Derek Jennings

(57) ABSTRACT

A method, system, and storage medium for implementing intelligent team management services. The method includes associating selected individuals with a datastore. The datastore houses content designated as key information and the selected individuals are designated as an entity. The method also includes creating a distribution list in a messaging application. The distribution list includes the selected individuals. The method further includes providing the selected individuals with access to the datastore.

44 Claims, 21 Drawing Sheets

IS THIS A KEY CONTENT ITEM?

CHECKING THIS BOX WILL STORE THE CONTENT ITEM IN YOUR TEAM FOLDER

DO YOU WANT TO SEND THIS ITEM TO ALL TEAM MEMBERS?

FIG. 9B

METHOD, SYSTEM, AND STORAGE MEDIUM FOR IMPLEMENTING INTELLIGENT TEAM MANAGEMENT SERVICES

BACKGROUND

Embodiments of the invention relate generally to data processing and communications services, and more particularly, to a method, system, and storage medium for implementing intelligent team management services.

Various organizational capabilities are provided by software products on the market. For example, file management features are typically included with word processing applications, and group classifications are provided by email and personal information management applications. Group classifications refer to designated selections of individuals to which, e.g., a communication may be directed via the email application. These features are often very helpful to application users that desire assistance in the management of organizational activities.

Additional organizational functionality is desirable, however, for application users who manage a variety of data that needs to be provided to individuals or groups of individuals. For example, it would be desirable to associate information or content items with selected individuals or groups such that up-to-date content is always available to the appropriate individuals, even when a targeted group of individuals changes over time.

SUMMARY

Exemplary embodiments relate to a method, system, and storage medium for implementing intelligent team management services. The method includes associating selected individuals with a datastore. The datastore houses content designated as key information and the selected individuals are designated as an entity. The method also includes creating a distribution list in a messaging application. The distribution list includes the selected individuals. The method further includes providing the selected individuals with access to the datastore.

The system includes a host system in communication with at least one client system and storage device over a network. The system also includes a messaging application executing on the host system and an intelligent team management application executing on at least one of the host system and the client system. The intelligent team management application associates selected individuals with a datastore in the storage device. The datastore houses content designated as key information and the selected individuals are designated as an entity. The intelligent team management application also creates a distribution list in the messaging application. The distribution list includes the selected individuals. The intelligent team management application also provides the selected individuals with access to the datastore via the client system.

The storage medium is encoded with machine-readable program code for implementing intelligent team management services. The program code includes instructions for causing a processor to implement a method. The method includes associating selected individuals with a datastore. The datastore houses content designated as key information and the selected individuals are designated as an entity. The method also includes creating a distribution list in a messaging application. The distribution list includes the selected individuals. The method further includes providing the selected individuals with access to the datastore.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 9B is a user interface screen for handling key content items (email notification) in exemplary embodiments;

DETAILED DESCRIPTION OF EXEMPLARY EMBODIMENTS

In accordance with exemplary embodiments, a method, system, and storage medium for implementing intelligent team management services are provided. The intelligent team management system provides the ability to manage data associated with groups or teams, as well as handle the provisioning of the data to selected teams and team members. The intelligent team management system enables authorized individuals to associate data to selected individuals or team (also referred to herein as an entity) such that new members will receive, and/or have access to, designated information (e.g., documents, links, calendar events, training materials, etc.) that is considered relevant to the team. This designated information is referred to herein as key content items. Further, the intelligent team management system enables authorized individuals to determine the manner in which the designated information is added to, and maintained within, a group or team repository.

A team refers to any grouping of individuals for a specified purpose and which is determined to possess one or more common interests. A team owner refers to an individual that is responsible for establishing and maintaining a team and related team information. A team member refers to an individual assigned to a team, other than the team owner.

Figure 1:
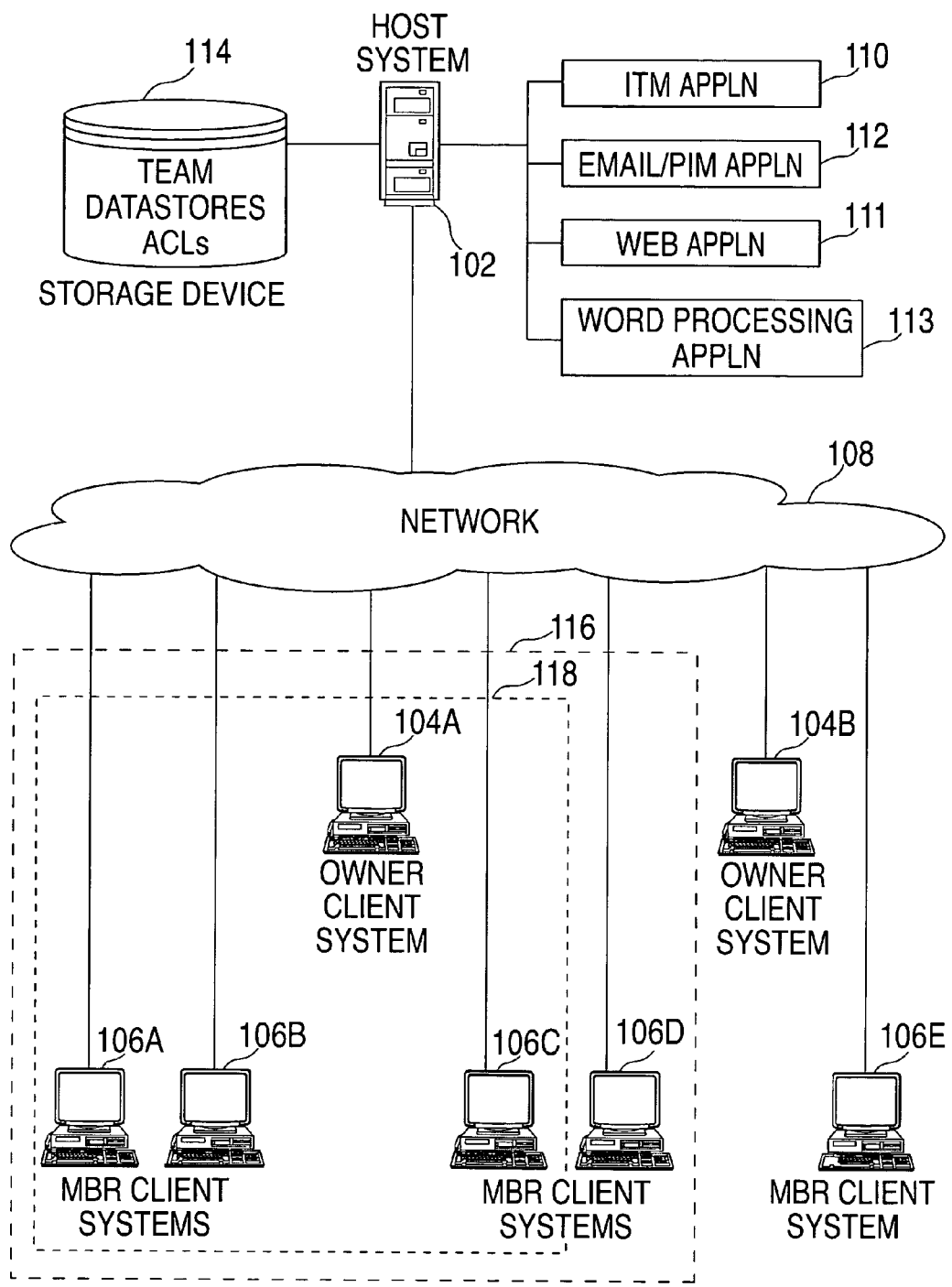
FIG. 1 is a block diagram of a system upon which the intelligent team management system may be implemented in exemplary embodiments.

Turning now to FIG. 1, a block diagram of a system upon which the intelligent team management system may be implemented in exemplary embodiments will now be described. The intelligent team management system of FIG. 1 includes a host system 102 in communication with two 'owner' client systems 104A and 104B and five 'member' client systems 106A-E via a network 108. Host system 102 may be implemented using one or more servers operating in response to a computer program stored in a storage medium accessible by the server. The host system 102 may operate as a network server (e.g., a web server 111) to communicate with client systems 104A-B and 106A-E and perhaps external entities outside of network 108. The host system 102 may handle sending and receiving information to and from owner client systems 104A-B and member client systems 106A-E and may perform associated tasks.

The host system 102 may also operate as an application server. The host system 102 executes one or more computer programs to provide intelligent team management services. These one or more computer programs are referred to collectively herein as an intelligent team management application 110. In exemplary embodiments, host system 102 executes a messaging application 112 (e.g., an email/personal information management (PIM) application), a web application 111, and a word processing application 113. In alternative embodiments, the intelligent team management application 110 may be built in or incorporated into one or more systems/applications executing on host system 102. For example, the email/PIM application 112 may provide the intelligent team management system functions, or alternatively, the network operating system of host system 102 may include the functionality of the intelligent team management system. If the intelligent team management application 110 is implemented separately from other applications, it may include an application programming interface (API) for communicating with one or more of the applications (e.g., email/PIM application 112, web server 111, word processing application 113, etc.) executing on host system 102.

Processing of intelligent team management activities may be shared by the owner client systems 104A-B (and authorized member client systems 106A-E) and the host system 102 by providing an application (e.g., java applet) to the client systems 104A-B, 106A-E. Alternatively, client systems 104A-B, 106A-E may include stand-alone software applications for performing a portion or all of the processing described herein. As previously described, it is understood that separate servers may be utilized to implement the network server functions and the application server functions of host system 102. Alternatively, the network server and the application server may be implemented by a single server executing computer programs to perform the requisite functions described with respect to host system 102.

Owner client systems 104A-B and member client systems 106A-E may be coupled to host system 102 via network 108. Each of client systems 104A-B and 106A-E may be implemented using a general-purpose computer executing a computer program for carrying out some of the processes described herein. The client systems 104A-B and 106A-E may be personal computers (e.g., a lap top, a personal digital assistant) or host attached terminals.

For purposes of illustration, client systems 104A-B are operated by supervisors or management personnel (also referred to herein as 'team' owners) and client systems 106A-E are operated by members of a team that is lead by a team owner. As shown in FIG. 1, client system 104A is operated by a team owner whose team comprises member client systems 106A-D. This team is represented as team 116 in the system of FIG. 1. Sub-teams, or teams within a team (a subset of a team), may also be implemented as shown in the intelligent team management system of FIG. 1. For example, within team 116 is a sub-team 118 comprising owner client system 104A and member client systems 104A-C.

In exemplary embodiments, the intelligent team management system shown in FIG. 1 includes a storage device 114. Storage device 114 is in communication with host system 102 and may be implemented using a variety of devices for storing electronic information. It is understood that the storage device 114 may be implemented using memory contained in the host system 102 or it may be a separate physical device. The storage device 114 is logically addressable as a consolidated data source across a distributed environment that includes network 108. Information stored in the storage device 114 may be retrieved and manipulated via the host system 102 and authorized users of clients systems 104A-B and client systems 106A-E. The storage device 114 houses one or more team datastores, access control lists, and other information desired by the enterprise of host system 102. A team datastore refers to storage space allocated by the intelligent team management system to a team. The datastore houses key content items accessible to the team's members as will be described further herein. In an exemplary embodiment, the host system 102 operates as a database server and coordinates access to application data including data stored on storage device 114.

Network 108 may be any type of known network including, but not limited to, a wide area network (WAN), a local area network (LAN), a global network (e.g. Internet), a virtual private network (VPN), and an intranet. The network 108 may be implemented using a wireless network or any kind of physical network implementation known in the art. Client systems 104A-B and/or client systems 106A-E may be coupled to the host system 102 through multiple networks (e.g., intranet and Internet) so that not all client systems are coupled to the host system 102 through the same network. One or more of the client systems and the host system 102 may be connected to the network 108 in a wireless fashion. In one embodiment, the network is an intranet and one or more client systems execute a user interface application (e.g. a web browser) to contact the host system 102 through the network 108 while another client system is directly connected to the host system 102.

Figure 3:
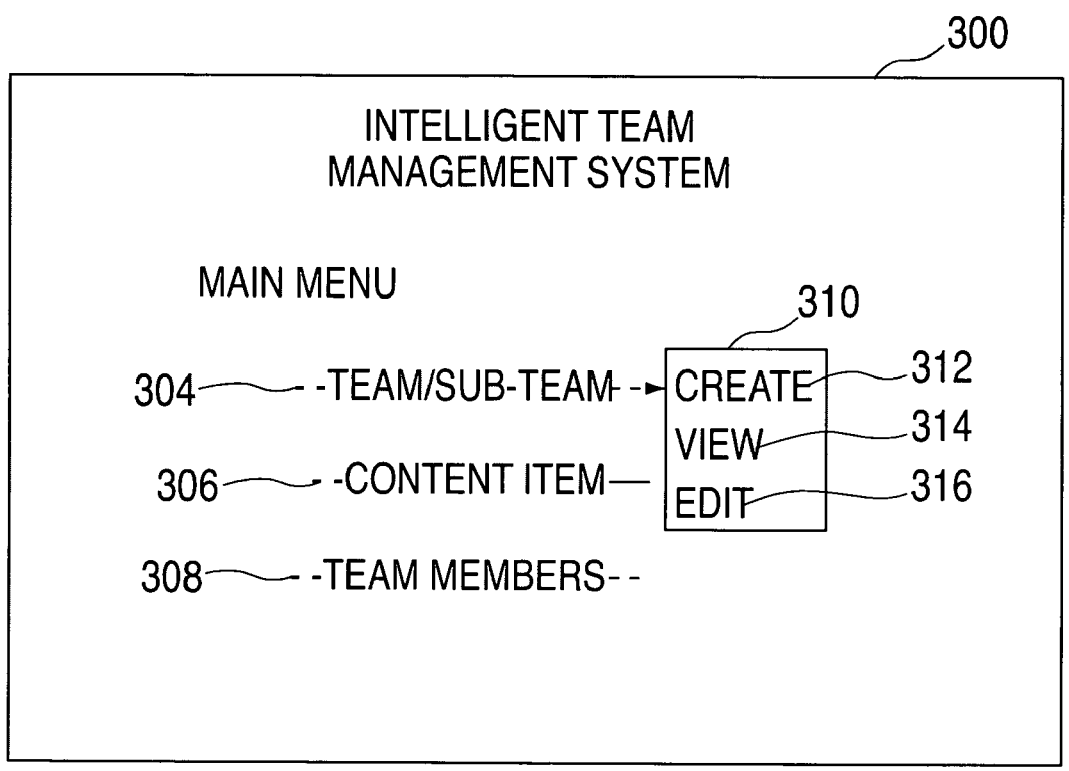
FIG. 3 is a user interface screen depicting a sample main menu of the intelligent management system application in exemplary embodiments.
Figure 4:
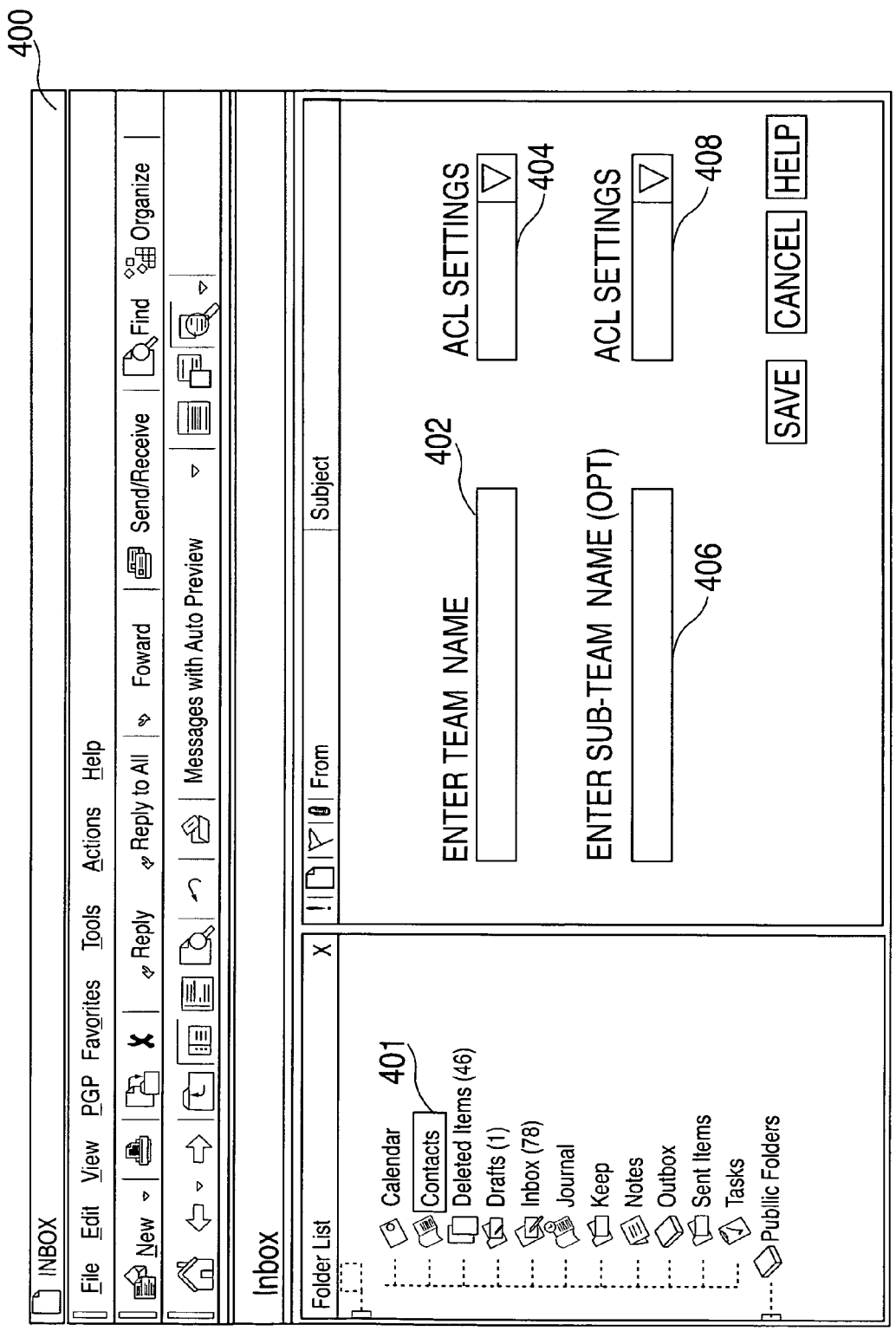
FIG. 4 is a user interface screen for creating/editing a team or sub-team in exemplary embodiments.

As indicated above, the intelligent team management system may be implemented via a separate application 110 or may be built into one or more existing applications (e.g., email/PIM application 112, word processing application 113, operating system, a combination of the above). If the intelligent team management system is implemented via a separate application 110, it may include a user interface for guiding a user through its processes. The flow diagram of FIG. 2 describes a process for creating a team whereby the intelligent team management system provides a separate application 110 that interfaces with email/PIM application 112. FIG. 3 depicts a user interface screen 300 and main menu of the intelligent team management application 110 that corresponds to the process recited in the flow diagram of FIG. 2. FIG. 4 depicts a user interface screen 400 for creating a team via the email/PIM application 112, whereby the intelligent team management application 110 is built into to the email/PIM application 112. The intelligent team management system provides the ability for authorized individuals (e.g., team owners) to create teams and sub-teams as will now be described with reference to FIGS. 2-4.

Figure 2:
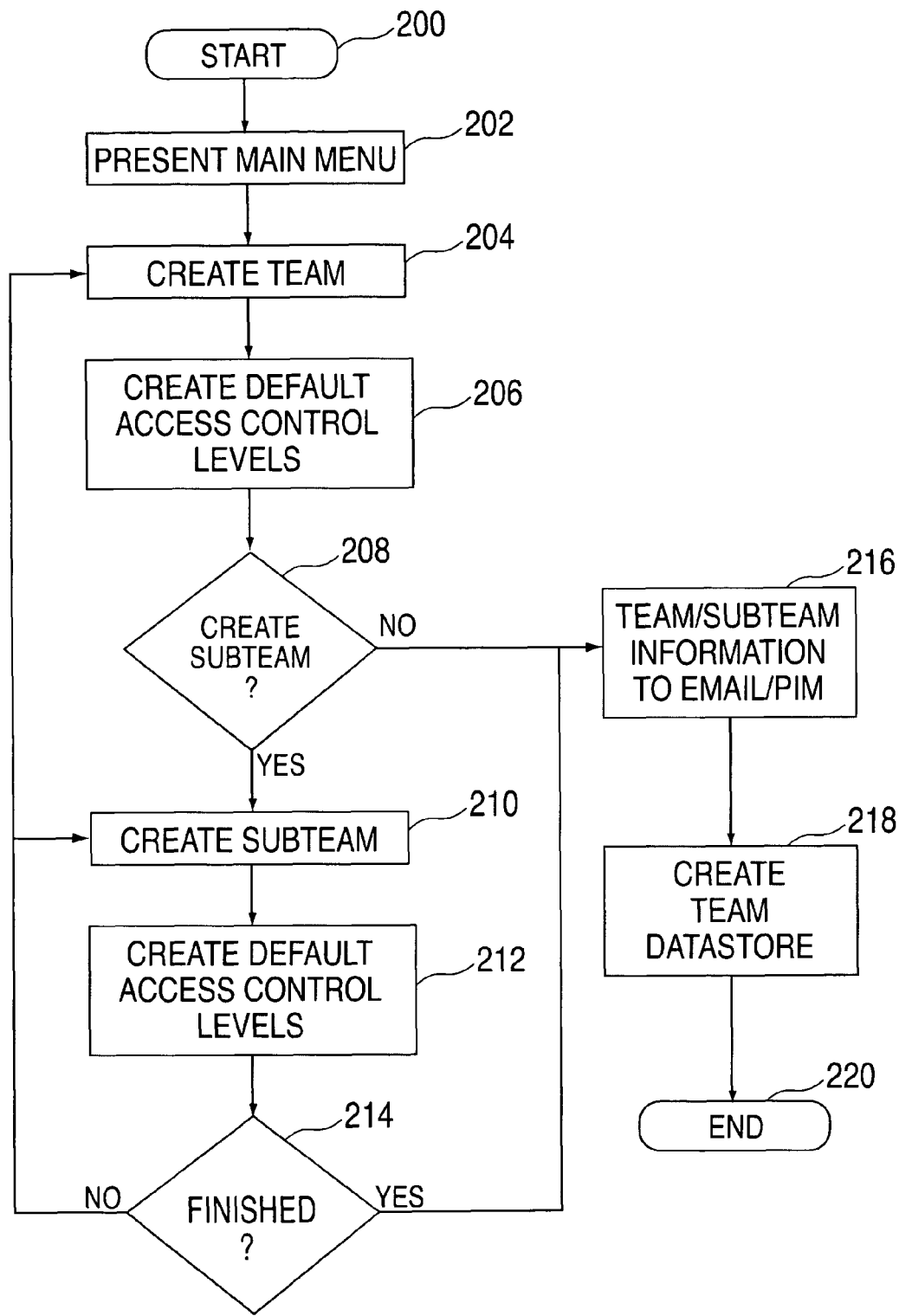
FIG. 2 is a flow diagram of a process for creating a team utilizing the intelligent management system in exemplary embodiments.

The process described in the flow diagram of FIG. 2 begins at step 200 whereby a team owner desires to create a new team using the intelligent team management application 110. Upon initiating the intelligent team management application 110 via, e.g., owner client system 104A, a user interface screen 300 (FIG. 3) and main menu is presented to the team owner at step 202. Alternatively, if the intelligent team management application 110 is built into the email/PIM application 112, the team owner may access this option via, e.g., the Contacts option 401 from the team owner's inbox shown in the user interface screen 400 of FIG. 4.

As can be seen from the user interface screen 300 (FIG. 3), three menu options are available to the team owner: TEAM/SUB-TEAM option 304, CONTENT ITEM option 306, and TEAM MEMBERS option 308. To create a new team, the team owner selects the TEAM/SUB-TEAM option 304. A sub-window 310 is presented with further options within the TEAM/SUB-TEAM option 304, namely, CREATE 312, VIEW 314, and EDIT 316. The team owner selects the CREATE option 312. The process flow of FIG. 2 proceeds to step 204, whereby the intelligent team management application 110 prompts the team owner to enter general information for the team (e.g., team name or identification). As shown in FIG. 4, a box 402 for entering a team name is provided.

The intelligent team management system application 110 then prompts the team owner to enter default access control levels (e.g., box 404) for the team created at step 206. The default access control levels will prescribe the nature of access to materials and information for members of the team once the members have been specified. For example, access control may allow 'read' access to information in the team datastore but not 'write' access.

At step 208, the intelligent team management application 110 queries the team owner to see whether a sub-team is needed for this new team. This step may be useful when the team owner determines that some team members will need greater access to information in the team's datastore than other team members. If the team owner responds affirmatively, the intelligent team management application 110 prompts the team owner to enter information relating to the sub-team to be created at step 210 (e.g., sub-team name or identification). Alternatively, the user interface 400 of FIG. 4 provides a box 406 for providing the name of the sub-team. Again, the team owner is prompted to establish access control levels for the sub-team at step 212 (e.g., box 408).

Once the team/sub-team has been created, it is determined whether the team owner is finished at step 214. If not, the process returns to step 204 (if the team owner wishes to create another team) or step 208 (if the team owner wishes to create another sub-team). Otherwise, if the team owner is finished, or alternatively, if upon setting the access levels for the team (step 206), the team owner does not wish to create a sub-team, the information entered by the team owner is provided to the email/PIM application at step 216 for processing. The processing includes establishing a distribution list of team members such that group messaging may be implemented. Alternatively, if the intelligent team management application 110 is incorporated into the email/PIM application 112, the email/PIM application 112 already possesses the team/sub-team information; thus, no transfer of information is required. The intelligent team management application 110 then creates a datastore in storage device 114 for the newly created team/sub-team at step 218 and the process ends at step 220. This datastore is accessible only to the designated team members via the access control settings.

Figure 5:
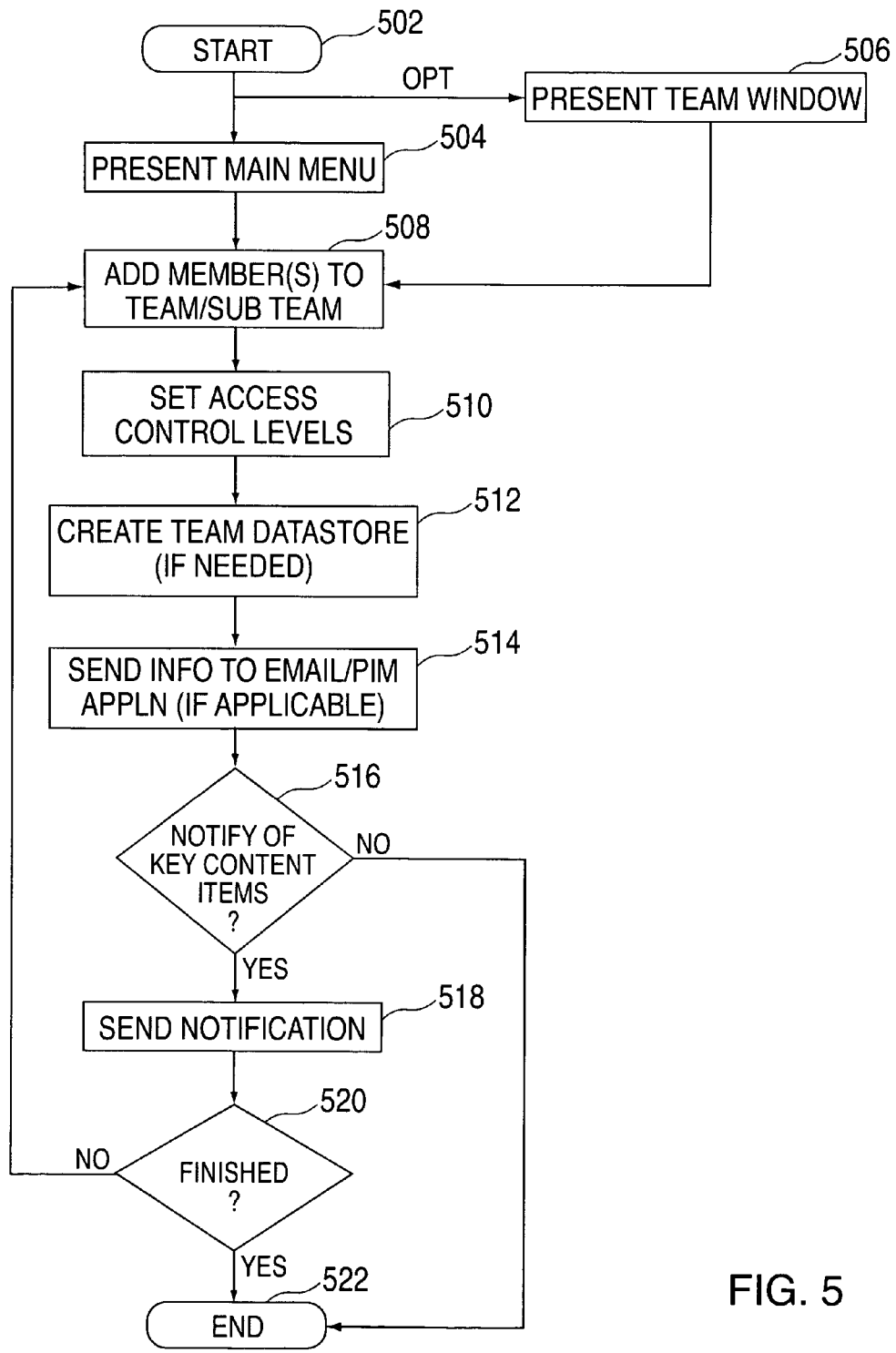
FIG. 5 is a flow diagram of a process for adding a member to a team or sub-team utilizing the intelligent management system in exemplary embodiments.
Figure 6:
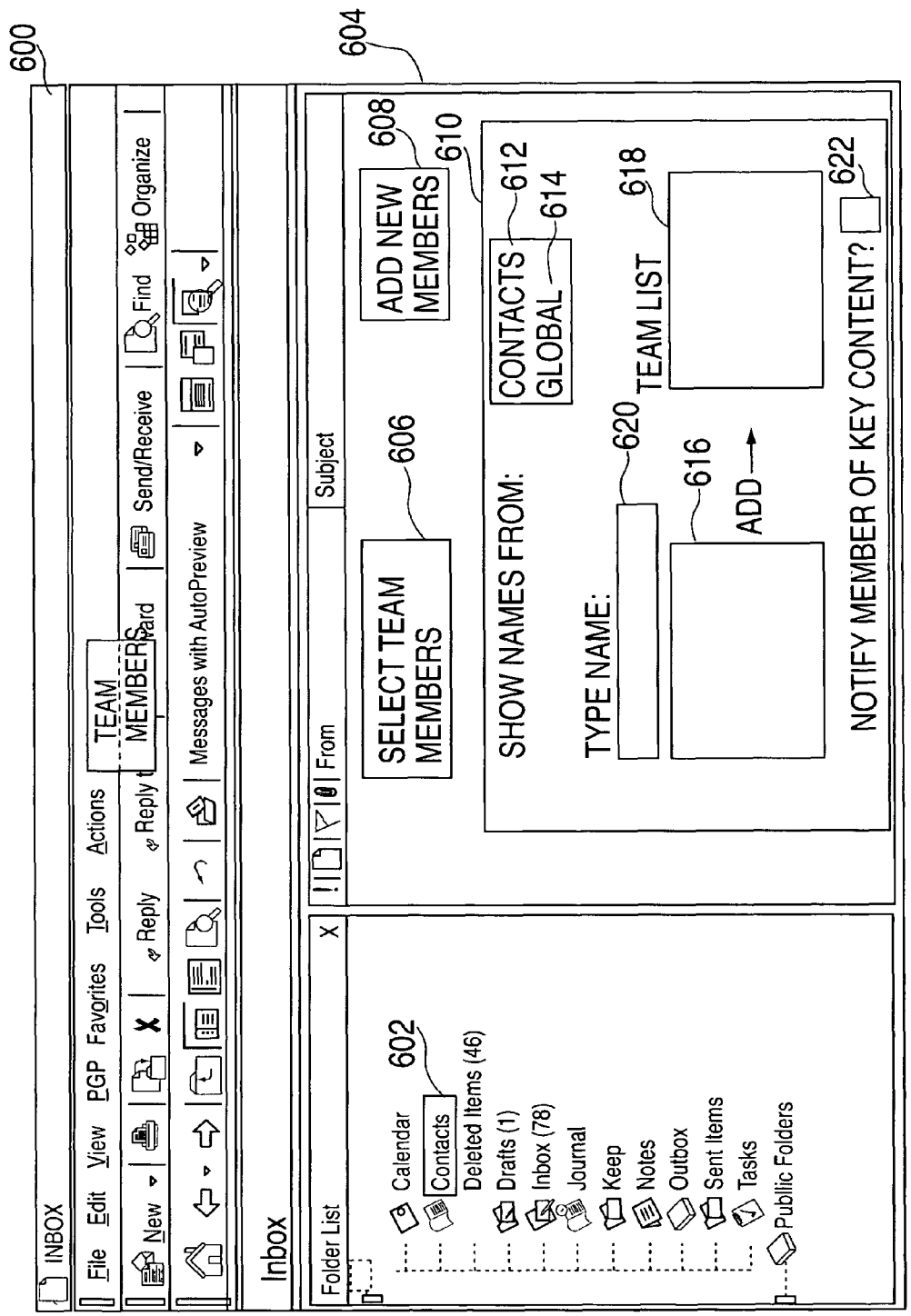
FIG. 6 is a user interface screen for adding/editing/deleting a team member utilizing the intelligent management system in exemplary embodiments.

A team owner or other authorized individual (e.g., via delegation to a team member), may add, edit, or remove members from a team via the intelligent team management system. These changes in membership are carried through to the corresponding team datastore such that access to team information (e.g., key content items) may be affected in accordance with the nature of the membership change. For example, if a new member is added to a team, the new member is provided with access to information in the team's datastore or links to information specified in the team's key content item index. The membership functions may be implemented via the intelligent team management application 110 in a manner similar to that described in FIGS. 3 and 4 above with respect to the team creation processes. FIG. 5 is a flow diagram of a process for adding a member to a team or sub-team utilizing the intelligent management system. FIG. 6 is a user interface screen illustrating a sample email window 600 of a team owner's inbox for managing team membership. While the process described below is directed to the addition of a new member to a team, it will be understood that other membership activities may be implemented via the intelligent team management system as well (e.g., edit membership, view membership, delete a member, etc.).

The process is initiated at step 502 whereby a team owner accesses the intelligent team management application 110 via, e.g., owner client system 104A of FIG. 1, and the user interface screen 300 of FIG. 3 is presented to the team owner along with a menu of options at step 504. The team owner selects the TEAM MEMBERS option 308 on the main menu of FIG. 3. Alternatively, if the intelligent team management system is built into the email/PIM application 112, the team owner accesses the email/PIM application 112 and the user interface screen 600 of FIG. 6 is presented. The team owner selects the Contacts option 602. The window 604 is then presented to the team owner. If the intelligent team management application 110 is a separate program, the intelligent team management application 110 may present a window similar to that shown in window 604.

The team owner may view the current list of team members by selecting option 606. The team owner adds new members by selecting option 608 at step 508. A sub-window 610 is presented. The team owner may select names from his/her contacts folder (e.g., option 612) or may select names from host system's global address list (e.g., option 614). Upon selecting one of options 612 or 614, the corresponding list of names are presented in box 616. The team owner browses through the list of names in box 616, selects a desired name from the list, and the name is automatically copied to box 618. Alternatively, the team owner may simply enter the individual's name to be added in box 620 and the intelligent team management system copies the name to box 618.

The team owner then enters the access levels authorized for this new team member at step 510. This step may be performed in a manner similar to that described in FIG. 4 for setting access levels for a team. Although access levels have been previously set for a team/sub-team as described in FIG. 4, the team owner may customize the access permissions for each individual in step 510 if desired. At step 512, if it is determined that a team datastore has not yet been created for the team, this may be performed in step 512. The team member information is then provided to the email/PIM application 112 (if the intelligent team management system is separately executed from the email/PIM application 112) at step 514.

The team owner is then prompted to specify whether the newly added team member is to be immediately notified of the key content information provided in the team datastore at step 516. This may be accomplished by selecting the checkbox 622 in FIG. 6. If the team owner indicates that key content information should be provided to the new team member, the intelligent team management system notifies the new member via, e.g., email notification and attachment or link to the team datastore at step 518. A sample key content item index is shown in FIG. 7.

At step 520, it is determined whether the team owner is finished. For example, the team owner may wish to add the new team member to one or more existing sub-teams of the team. If the team owner is not finished, the process returns to step 508. Otherwise, the process ends at step 522. Examples of a team and sub-team are shown in FIG. 1, whereby client systems 104A and 106A-D belong to team 116, and team 116 further comprises a sub-team 118 that includes client systems 104A and 106A-C.

In accordance with exemplary embodiments, key content items are managed by the intelligent team management system as described herein. The intelligent team management system includes an intelligent agent for providing search and analysis capabilities relating to content items. For example, the intelligent team management system may provide the intelligence to identify key terms within a document and determine whether there is a correlation to similar terms provided within a team datastore. Likewise, once a source of a content item is determined (e.g., team owner) by the intelligent team management system, the intelligent team management system may provide the ability to determine the members corresponding to the source of the item and, in association with key terms, determine the likelihood of whether a content item is material to a particular team. Armed with this information, the intelligent team management system may then suggest to a team owner that the content item be qualified as a key content item. Of course, it will be appreciated that other types of analysis and criteria may be utilized by the intelligent team management system.

Figure 7:
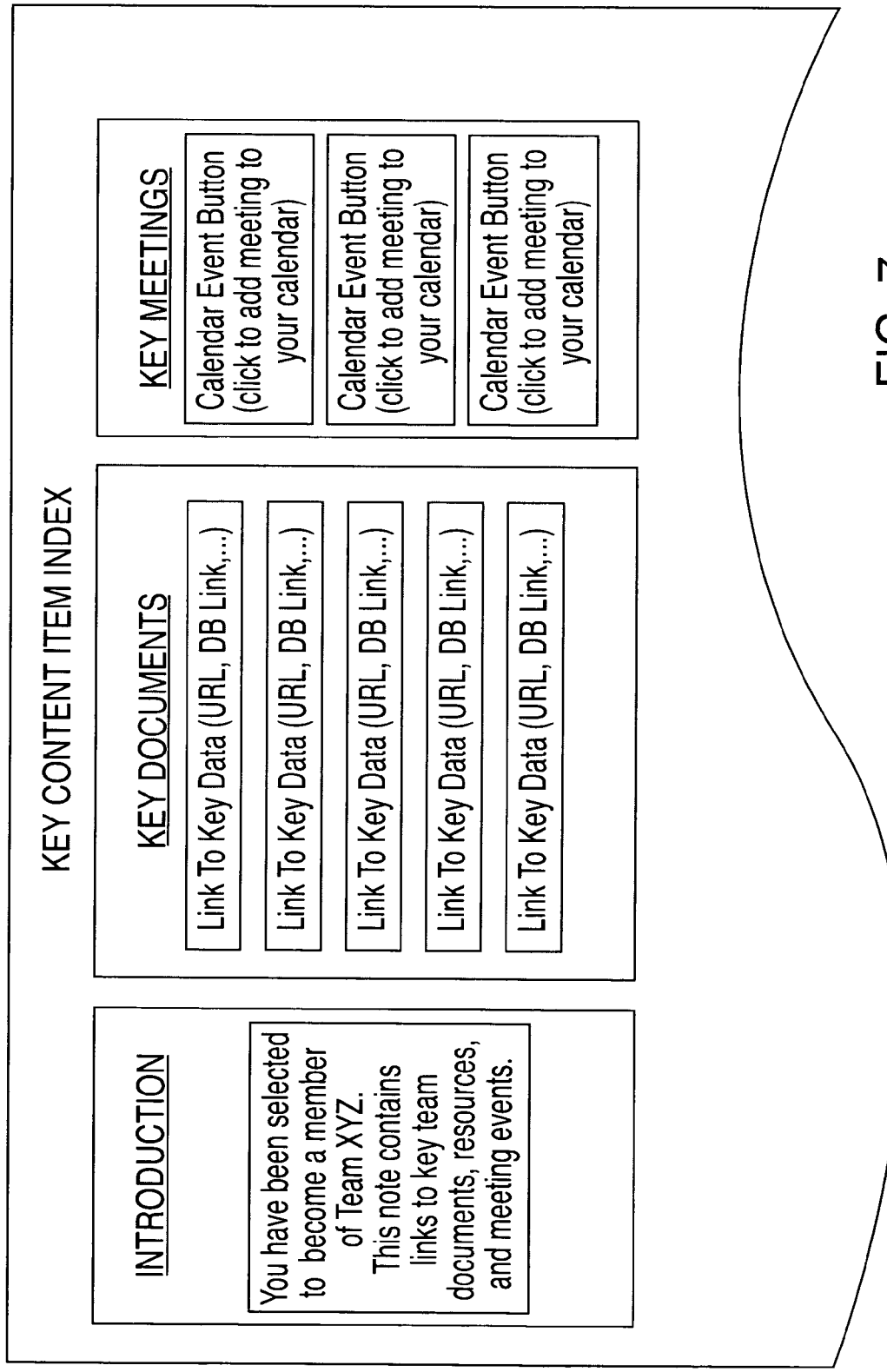
FIG. 7 is a sample key content item index created via the intelligent management system in exemplary embodiments.

FIG. 7 illustrates a sample key activity document created via the intelligent management system in exemplary embodiments. Key content item index 700 may include an introduction notice 702 to team members, as well as a listing 704 of all key documents and their respective links. The key content item index 700 may also include a listing 706 of key meetings along with an option to select the key meeting for saving the meeting information to the member's calendar.

Figure 8:
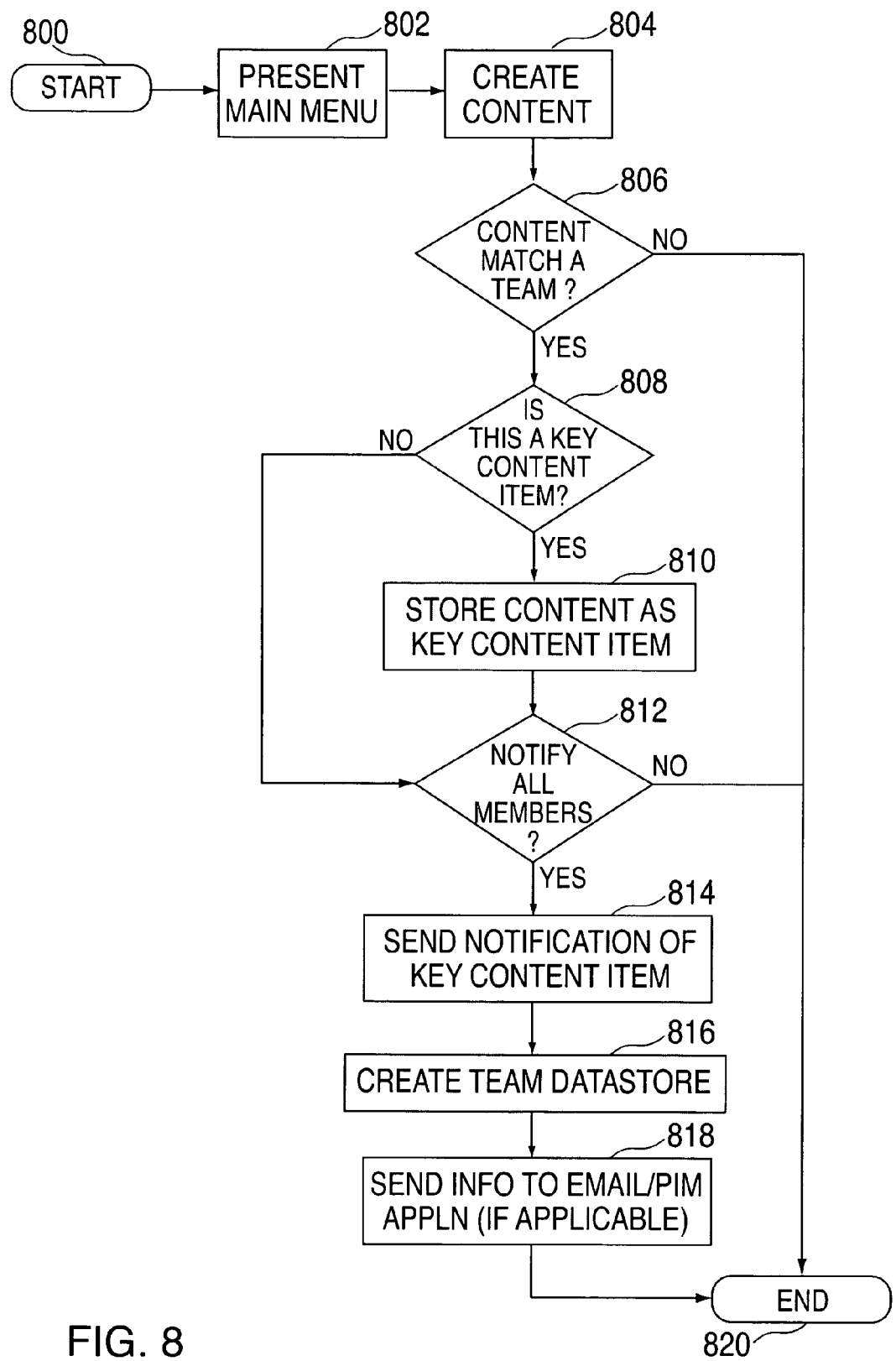
FIG. 8 is a flow diagram of a process for handling key content items in exemplary embodiments.
Figure 9A:
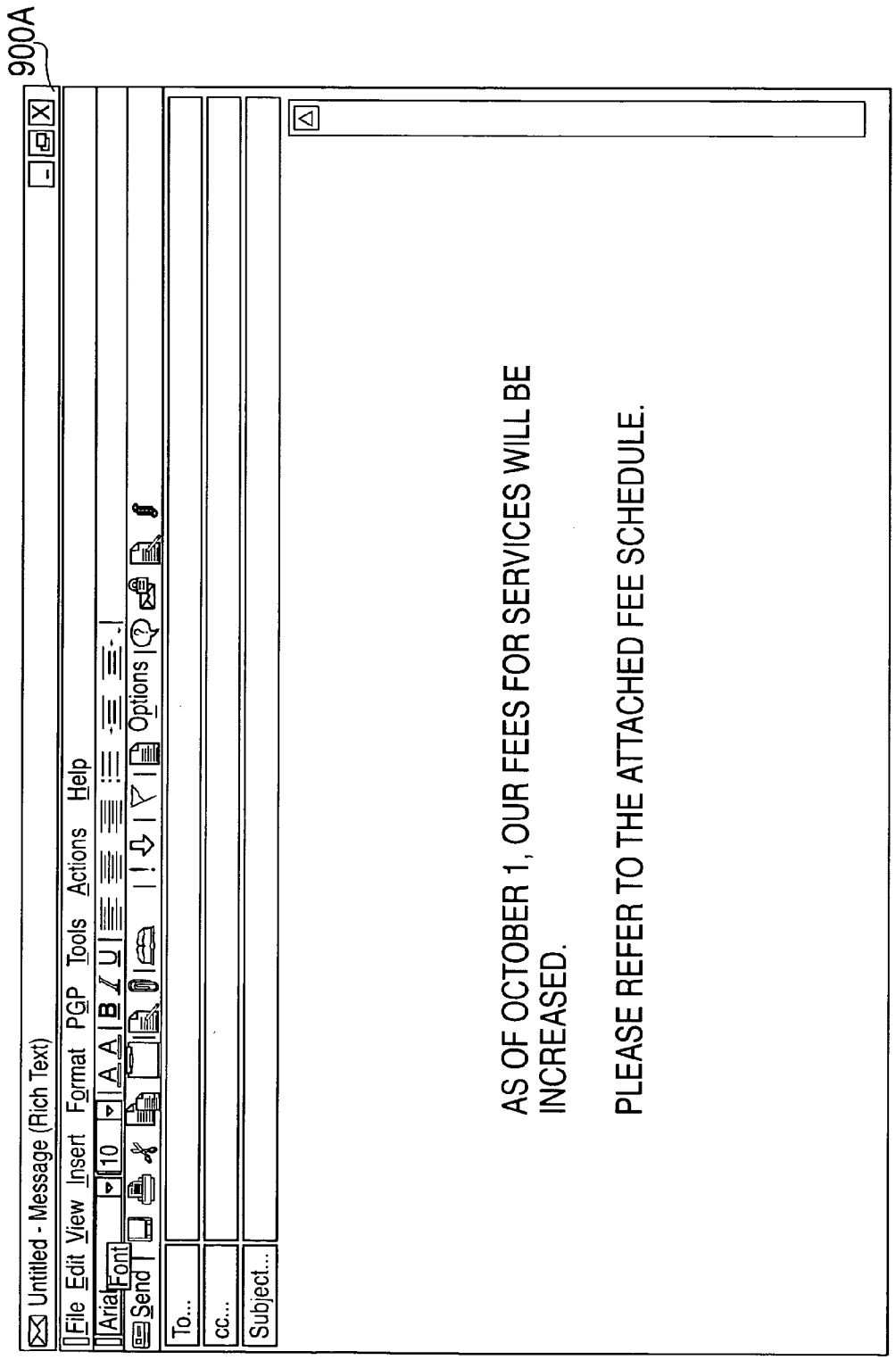
FIG. 9A is a user interface screen for handling key content items (email) in exemplary embodiments.
Figure 10A:
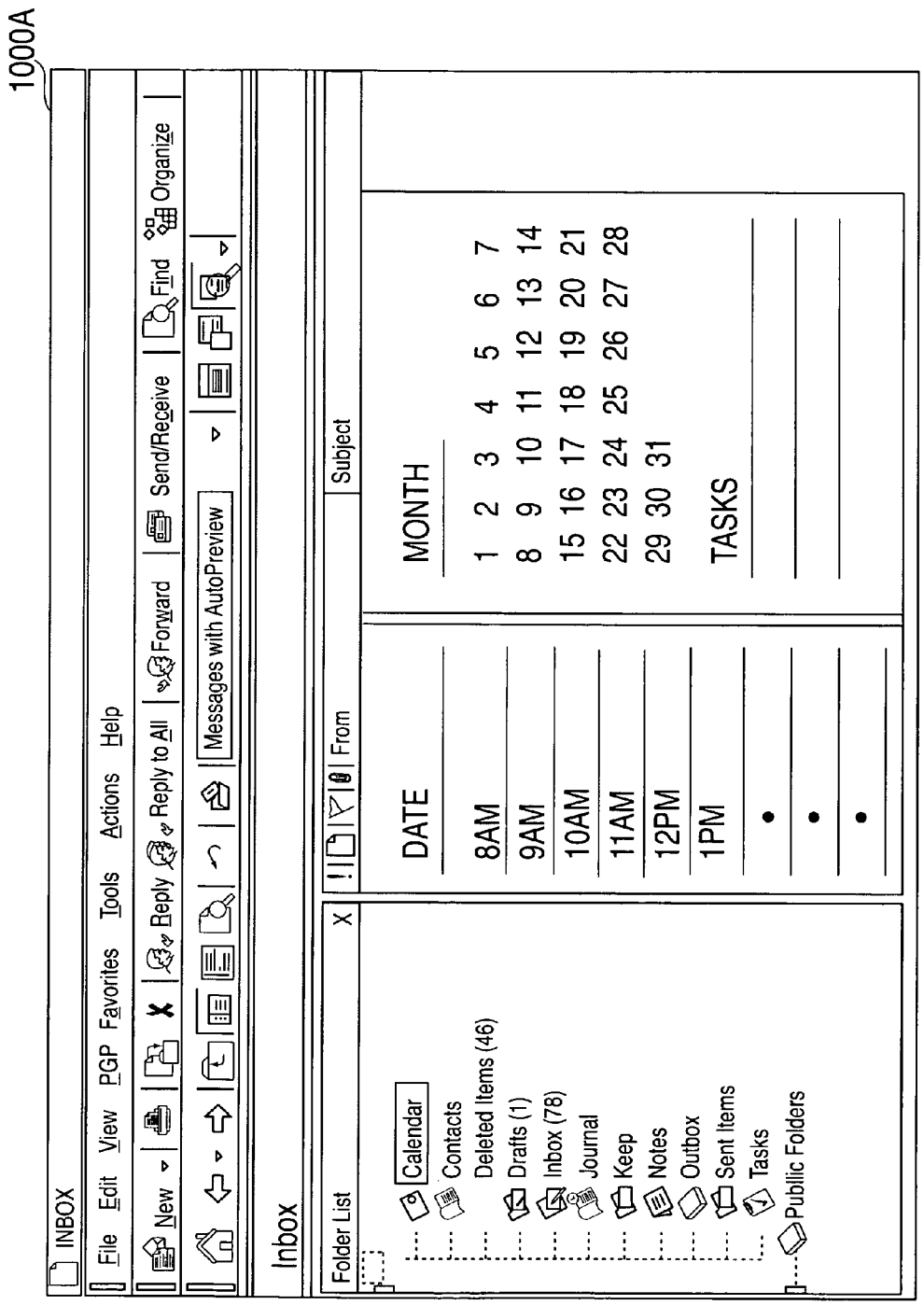
FIGS. 10A and 10B is a user interface screen for handling key content items (meeting) in exemplary embodiments.
Figure 10B:
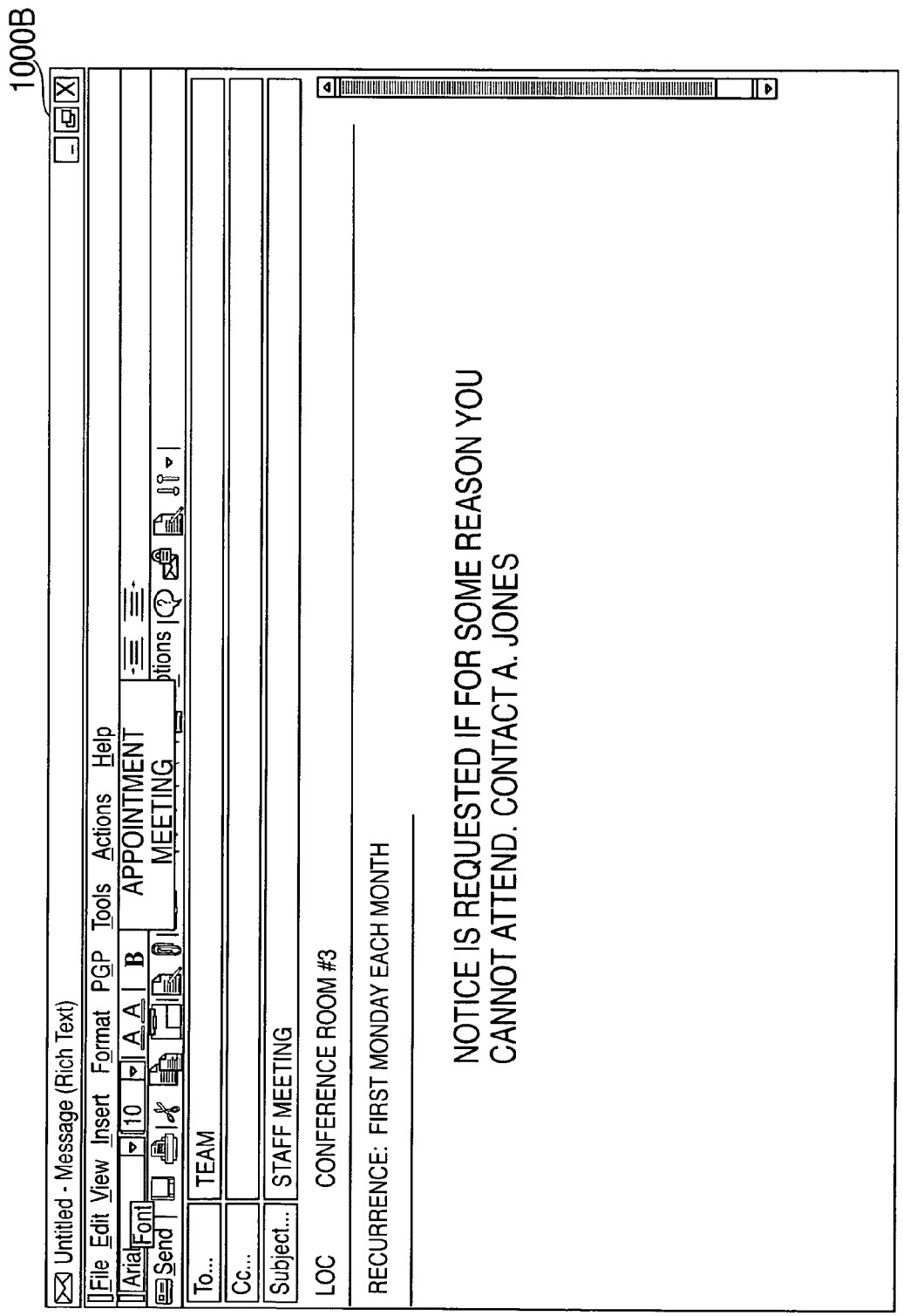

A team owner or authorized individual may create key content items for a team (and existing content items may be associated with, or designated as, a key content item) as described in the flow diagram of FIG. 8. In accordance with exemplary embodiments, a team owner begins the process of creating a key content item by initiating the intelligent team management system application 110 via, e.g., owner client system 104A at step 800. The main menu (user interface screen 300 of FIG. 3) is presented to the team owner at step 802. The team owner selects the CONTENT ITEM option 306. Alternatively, the intelligent team management system may be built into one or more other applications (e.g., 111, 113, operating system, etc.). For purposes of illustration, the content items shown in FIGS. 9A-B and 10A-B are generated from the intelligent team management system which is built into email/PIM application 112.

The team owner creates a content item at step 804. The content item may be a document, report, meeting, appointment, or other similar item. The intelligent team management system searches storage device 114 to determine whether this content item is associated with an existing team at step 806. If a team exists that is associated with the content item, the intelligent team management system then prompts the team owner to specify whether the content item is a key content item at step 808. A sample user interface screen 900B including this query is shown in FIG. 9B. Alternatively, as described above, the intelligent team management system may determine through analysis, that this item may be a key content item and suggest to the team owner that it be designated as such.

If the content item is determined not to be a key content item, the intelligent team management system queries the team owner to determine whether all team members should be notified of the content item at step 812. This query is shown in the user interface screen 900B of FIG. 9B. A content item, for example, that is not a key item but may involve a timely matter, may be immediately distributed to the team if desired. If, on the other hand, the content item is a key content item, the intelligent team management system stores the content item as a key content item in the respective datastore at step 810 and the process continues to step 812 where a notification query is presented to the team owner as described above.

If the team owner has indicated a desire to notify the team members of the key content item, the intelligent team management system application 110 sends a notification of the new content item to the team members at step 814. The intelligent team management system application 110 then creates a team datastore for the content item at step 816. The content item is then sent to the email/PIM application 112 (if needed) at step 418 and the process ends at step 820.

Alternatively, returning back to step 806, if the content item is not associated with a team or, if at step 812 no notification is desired, the process ends at step 820 as the content item may simply be stored as a non-team-related item in a separate storage space.

As described above with respect to FIG. 1, the intelligent team management system of the present invention may reside on a stand-alone computer system which may have access to the Internet, or may reside on a computer system which is part of the network through which there is Internet access. With a connection to a network and/or the Internet, there are several different ways in which the process software used to implement the systems and methods of the intelligent team management system may be integrated with the network, and deployed using a local network, a remote network, an e-mail system, and/or a virtual private network. The following descriptions review the various ways of accomplishing these activities.

Integration of Intelligent Team Management System Software. To implement the intelligent team management systems and methods of the present invention, process software, which is composed of the software as described above and related components including any needed data structures, is written and then if desired, integrated into a client, server, and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of the same with reference to the flowcharts of FIGS. 11A and 11B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems are identified and compared to the list of operating systems, version numbers, and network software that have been tested to work with the process software. Those operating systems, version numbers, and network software that do not match the list of tested operating systems and version numbers are then upgraded on the clients and servers to the required level.

After ensuring that the software resident on the computer systems where the process software is to be deployed is at the correct version level(s), that is, has been tested to work with the process software, the integration is completed. This is done by installing the process software on the clients and servers. Armed with the foregoing overview of the integration activity, the following detailed description of the same should be readily understood.

Figure 11A:
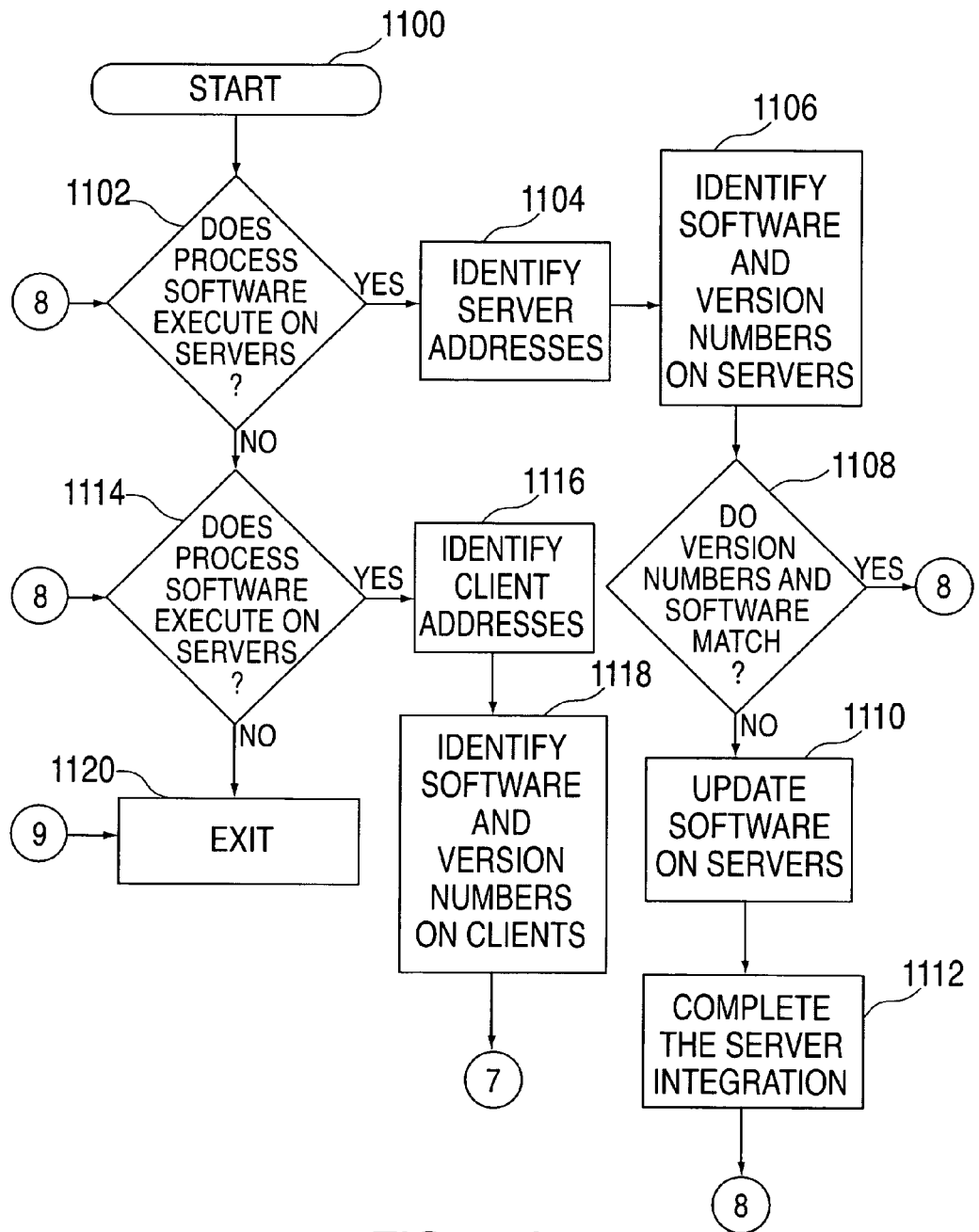
FIGS. 11A and 11B are flowcharts illustrating how the process software implementing the systems and methods of the invention may be integrated into client, server, and network environments.
Figure 11B:
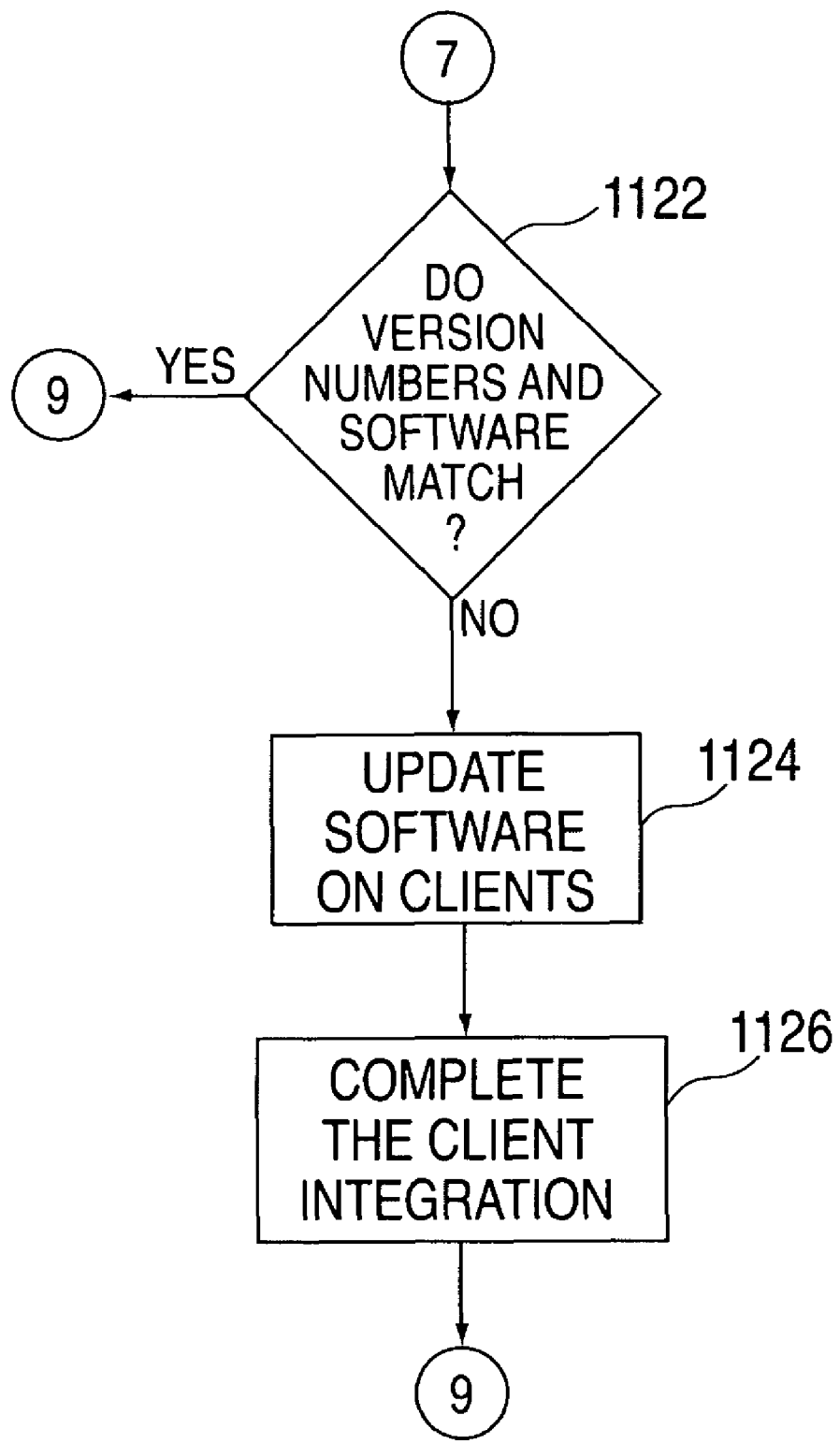

Referring to FIGS. 11A and 11B, step 1100 begins the integration of the process software for implementing the search and reference systems and methods of the present invention. It is determined whether there are any process software programs that will execute on a server or servers at step 1102. If this is not the case, then integration proceeds to determine if the process software will execute on clients at step 1114. If there are process software programs that will execute on a server(s), then the server addresses are identified at step 1104. The servers are checked to see if they contain software that includes the operating system (OS), applications, and network operating systems (NOS), together with their version numbers, that have been tested with the process software at step 1106. The servers are also checked to determine if there is any missing software that is required by the process software as part of the activity at step 1106. A determination is made whether the version numbers match the version numbers of OS, applications and NOS that have been tested with the process software at step 1108. If all of the versions match, and there is no missing required software, the integration continues at step 1114. If one or more of the version numbers do not match, then the unmatched versions are updated on the server or servers with the correct versions at step 1110. Additionally, if there is missing software, then it is updated on the server or servers at step 1110. The server integration is completed by installing the process software at step 1112.

Step 1114, which follows either step 1102, 1108 or 1112, determines if there are any programs of the process software that will execute on the clients. If no process software programs execute on the clients, the integration proceeds to step 1120 and exits. If there are process software programs that will execute on clients, the client addresses are identified at step 1116.

At step 1118, the clients are checked to see if they contain software that includes the operating system (OS), applications, and network operating systems (NOS) software, together with their version numbers, that have been tested with the process software. The clients are also checked at step 1118 to determine if there is any missing software that is required by the process software.

At step 1122, a determination is made if the version numbers match the version numbers of OS, applications and NOS that have been tested with the process software. If all of the versions match, and there is no missing required software, then the integration proceeds to step 1120 and exits.

If one or more of the version numbers do not match, then the unmatched versions are updated on the clients with the correct versions at step 1124. In addition, if there is missing required software, then it is updated on the clients as part of step 1124. The client integration is completed by installing the process software on the clients at step 1126. The integration proceeds to step 1120 and exits.

Deployment of Intelligent Team Management System Software. It should be well understood that the process software for implementing the intelligent team management system of the present invention may be deployed by manually loading the process software directly into the client, server, and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and then stored on the proxy server. Armed with this overview of the possible deployment processes, the following detailed description of the same with reference to FIGS. 12A and 12B, where the deployment processes are illustrated, will be more easily understood.

Step 1200 begins the deployment of the process software. It is determined whether there are any programs that will reside on a server or servers when the process software is executed at step 1202. If the answer is "yes", then the servers that will contain the executables are identified, as indicated in step 1236 in FIG. 12B. The process software for the server or servers is transferred directly to the servers' storage via FTP or some other protocol or by copying though the use of a shared file system at step 1238. The process software is then installed on the servers as indicated at step 1240.

Figure 12A:
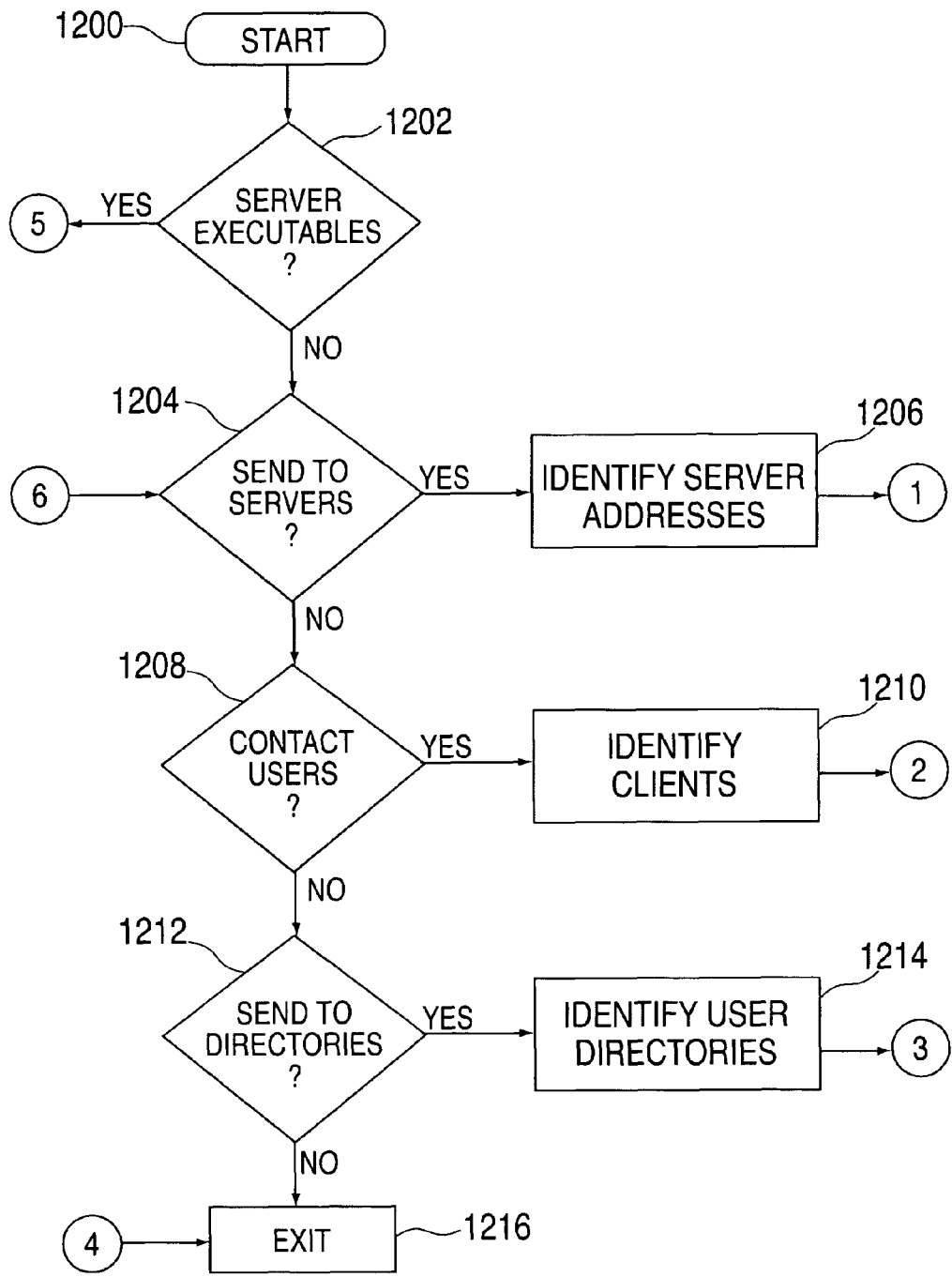
FIGS. 12A and 12B are flowcharts illustrating various ways in which the process software of the invention may be semi-automatically or automatically deployed across various networks and onto server, client (user), and proxy computers.
Figure 12B:
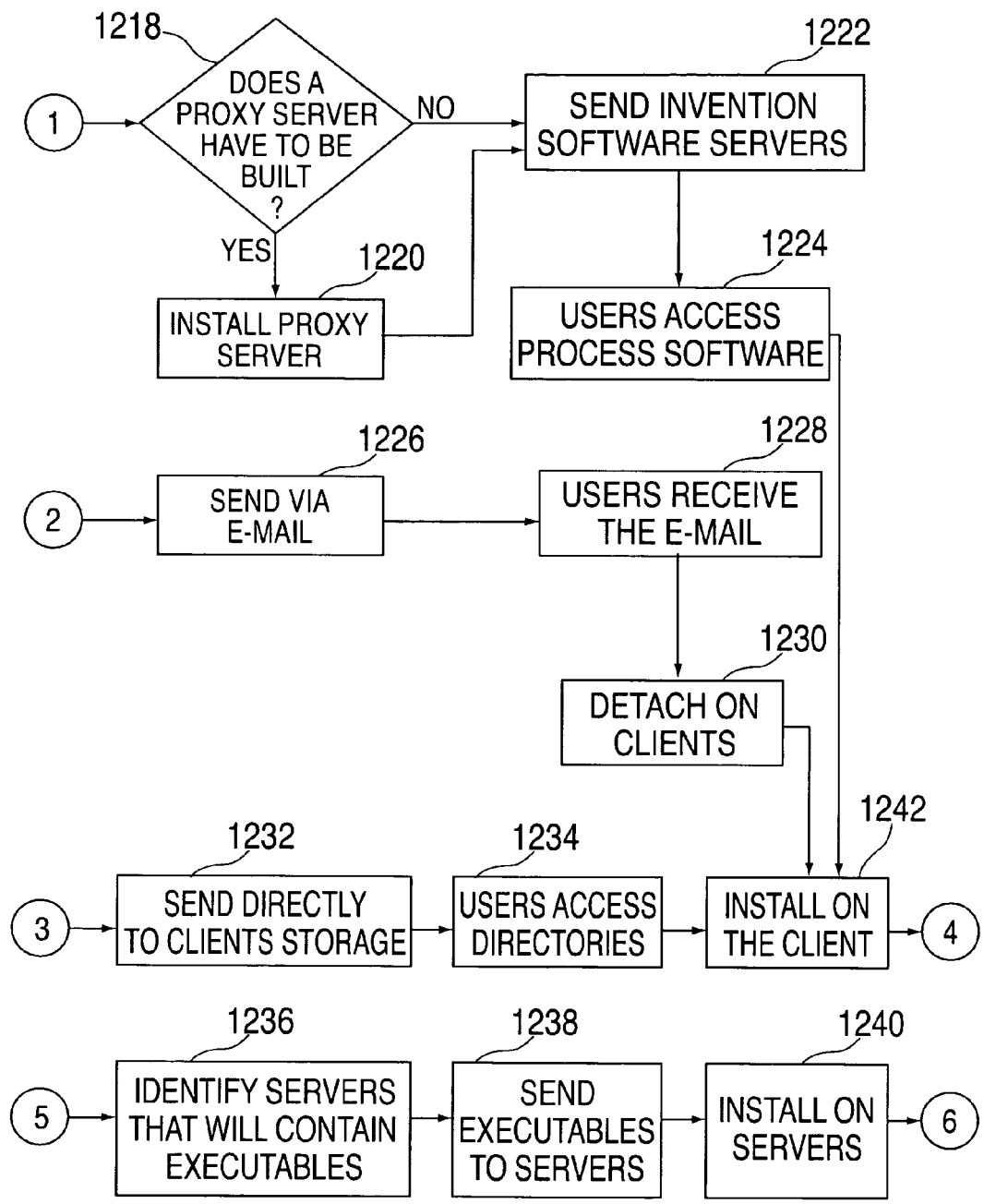

Next, as shown in step 1204 in FIG. 12A, a determination is made on whether the process software is to be deployed by having users access the process software on a server or servers. If the users are to access the process software on servers, then the server addresses that will store the process software are identified at step 1206.

Next, as shown at step 1218, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 1220. Next, the process software for implementing the present invention is sent to the servers, as indicated in step 1222 either via a protocol such as FTP or it is copied directly from the source files to the server files via file sharing. Another way of sending the process software to the servers is to send a transaction to the servers that contained the process software and have the server process the transaction. In this manner, the process software may be received by and copied into the server's file system. Once the process software is stored at the servers, the users via their client computers, then access the process software on the servers and copy it into to the file systems of their client computers at step 1224. Another alternative is to have the servers automatically copy the process software to each client and then run the installation program for the process software at each client computer. Either way, the user computer executes or causes to be executed the program that installs the process software on the client computer at step 1242, then the process exits at step 1216.

Continuing now at step 1208 in FIG. 12A, a determination is made as to whether the process software is to be deployed by sending the process software to users via e-mail. If the answer is yes, then, as indicated at step 1210, the set of users where the process software will be deployed are identified together with the addresses of the user client computers. The process software is sent via e-mail in step 1226 (shown in FIG. 12B) to each of the users' client computers. Then, as indicated in step 1228, the users receive the e-mail, and then detach the process software from the e-mail to a directory on their client computers at step 1230. The user then executes the program that installs the process software on his client computer at step 1242, and then exits the process at step 1216.

Continuing at step 1212 (see bottom of FIG. 12A), a determination is made on whether the process software will be sent directly to user directories on their client computers. If so, the user directories are identified at step 1214. Then, the process software is transferred directly to the identified directory on the user's client computer, as indicated in step 1232. This can be done in several ways such as, but not limited to, sharing of the file system directories and then copying them from the sender's file system to the recipient user's file system or, alternatively, using a transfer protocol such as File Transfer Protocol (FTP). Next, the users access the directories on their client file systems, as indicated in step 1234, in preparation for installing the process software. Finally, the user executes the program that installs the process software on his client computer at step 1242 and then exits the process at step 1216.

Use of Virtual Private Networks for Intelligent Team Management System Software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as a leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed, and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters can then dial a phone number (often a toll-free number) or attach directly via a cable, DSL, or wireless modem to reach the NAS and use their VPN client software to access the corporate network and to access, download, and execute the process software.

When using a site-to-site VPN, the process software is typically deployed, accessed and executed through the use of dedicated equipment and large-scale encryption. These tools are often used to connect multiple fixed sites of a larger company over a public network such as the Internet.

The process software is transported over the VPN via a process called tunneling. Tunneling is process involving the placing of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 13A-13C should be more readily understood.

Figure 13A:
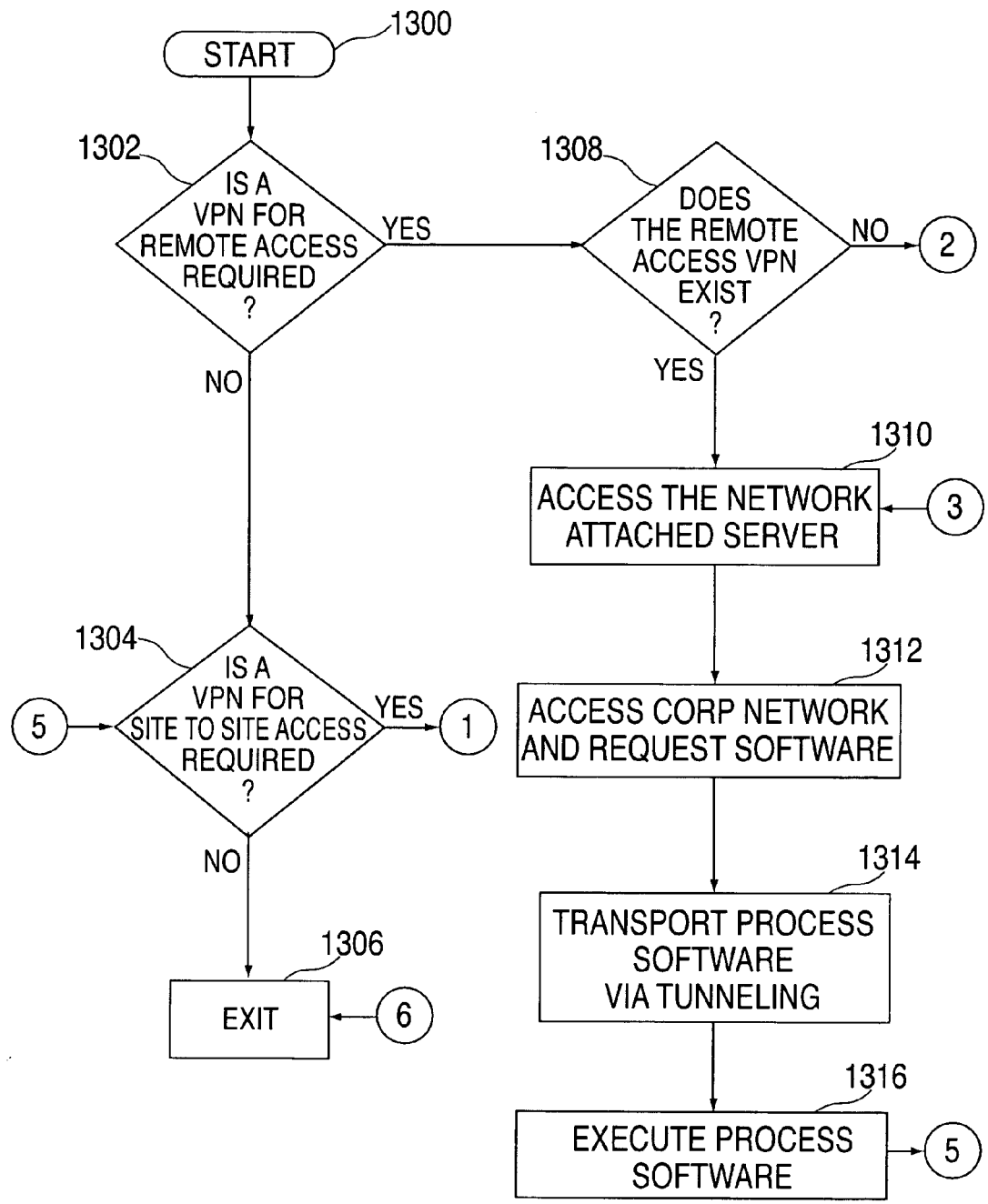
FIGS. 13A through 13C are flowcharts illustrating how process software for implementing the systems and methods of the invention are deployed through the installation and use of two different forms of a virtual private network (VPN)
Figure 13B:
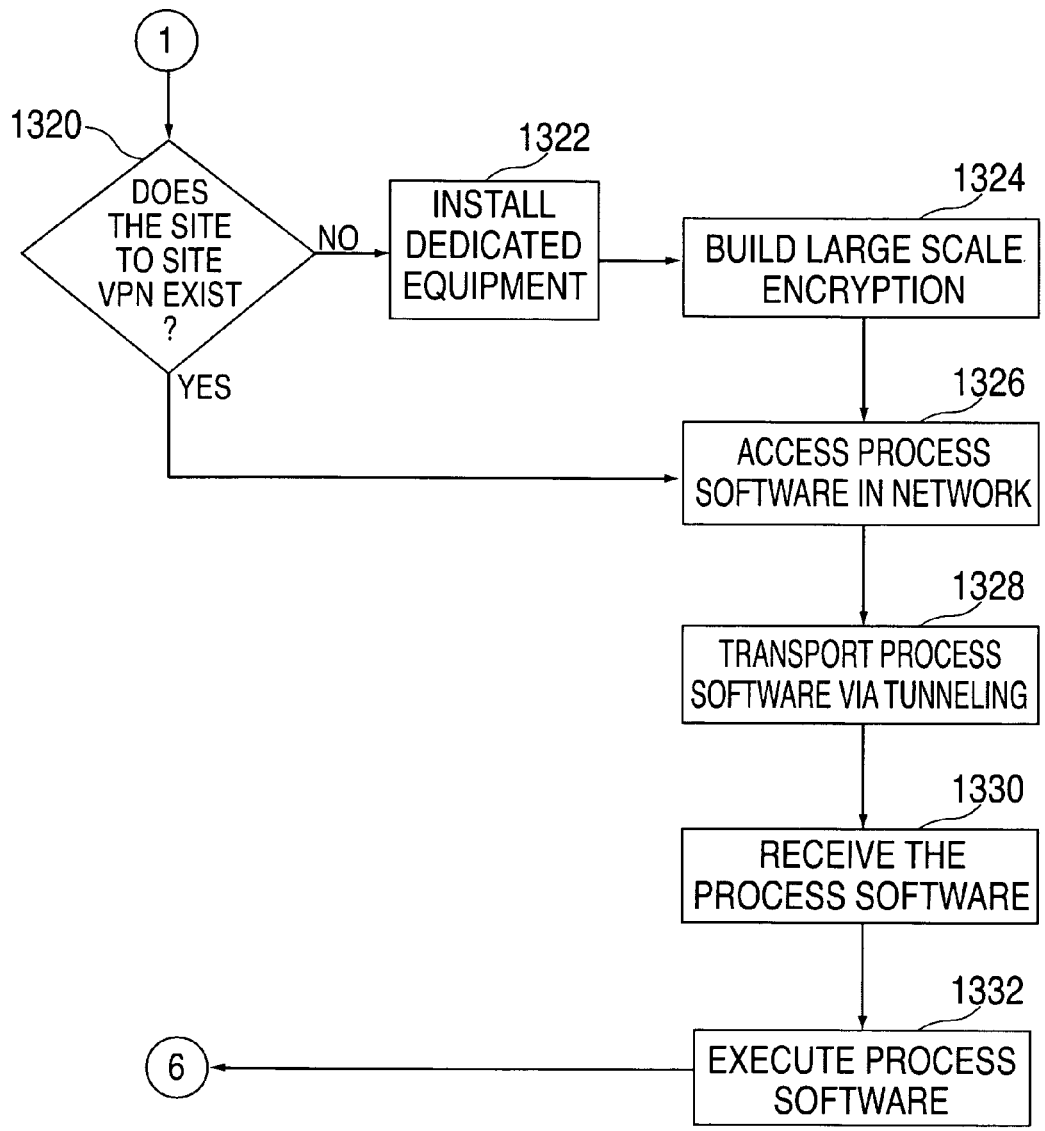
Figure 13C:
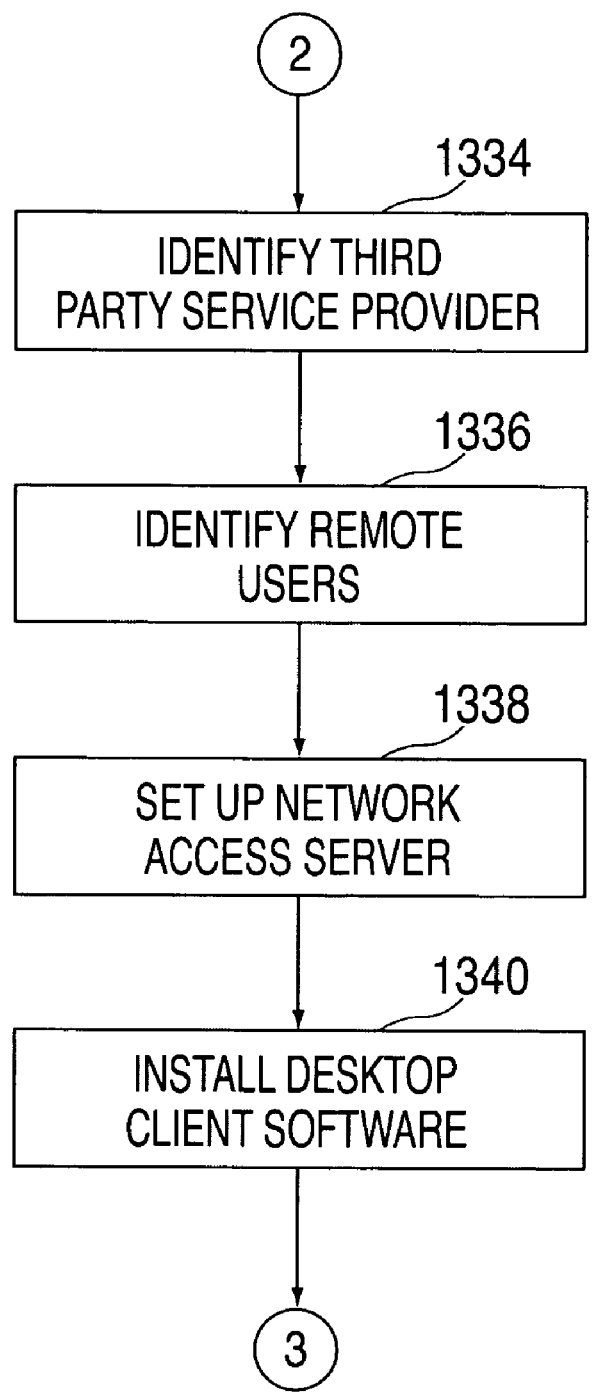

Step 1300 in FIG. 13A begins the virtual private network (VPN) process. A determination is made at step 1302 to see if a VPN for remote access is required. If it is not required, then flow proceeds to step 1304. If it is required, then flow proceeds to step 1308 where a determination is made as to whether a remote access VPN exists that is available for use.

If a remote access VPN does exist, then flow proceeds to step 1310 in FIG. 13A. Otherwise flow proceeds to step 1334 (see top of FIG. 13C), where a third party provider that will provide the secure, encrypted connections between the company's private network and the company's remote users is identified. Next, as indicated in step 1336, the company's remote users are identified. Then, at step 1338, the identified third party provider then sets up a network access server (NAS). The NAS allows the remote users to dial a phone number (typically a toll free number) or attach directly via a cable, DSL, wireless or other modem to access, download and install the desktop client software for the remote-access VPN as indicated at step 1340.

Returning to step 1310 in FIG. 13A, after the remote access VPN has been built or if it been previously installed, the remote users can then access the process software by dialing into the NAS or attaching directly via a cable, DSL, or other modem into the NAS. This step 1310 allows entry into the corporate network, as indicated at step 1312, where the process software may be accessed. The process software is transported to the remote user's desktop computer over the network via tunneling. During tunneling, see step 1314, the process software is divided into packets and each packet, including the data and protocol for that packet, is placed within another packet. When the process software arrives at the remote user's desktop computer, it is removed from the packets, reconstituted, and then may be executed on the remote users desktop, as indicated at step 1316.

Returning now to step 1304 in FIG. 13A, a determination is made to see if a VPN for site-to-site access is required. If it is not required, then the process exits at step 1306. If it is required, flow proceeds to step 1320 (see top of FIG. 13B) to determine if the site-to-site VPN exists. If it does exist, then flow proceeds to step 1326. If it does not exist, then as indicated at step 1322, dedicated equipment required to establish a site-to-site VPN is installed. Then the large-scale encryption is built into the VPN at step 1324.

After the site-to-site VPN has been built or if it had been previously established, the users access the process software via the VPN as indicated in step 1326. Next, the process software is transported to the site users over the network via tunneling as indicated in step 1328. As previously explained, the process software is divided into packets and each packet including the data and protocol is placed within another packet, as indicated in step 1330. When the process software arrives at the remote user's desktop, it is removed from the packets, reconstituted, and is executed on the site users desktop at step 1332. The process then proceeds to step 1306 and exits.

Figure 14A:
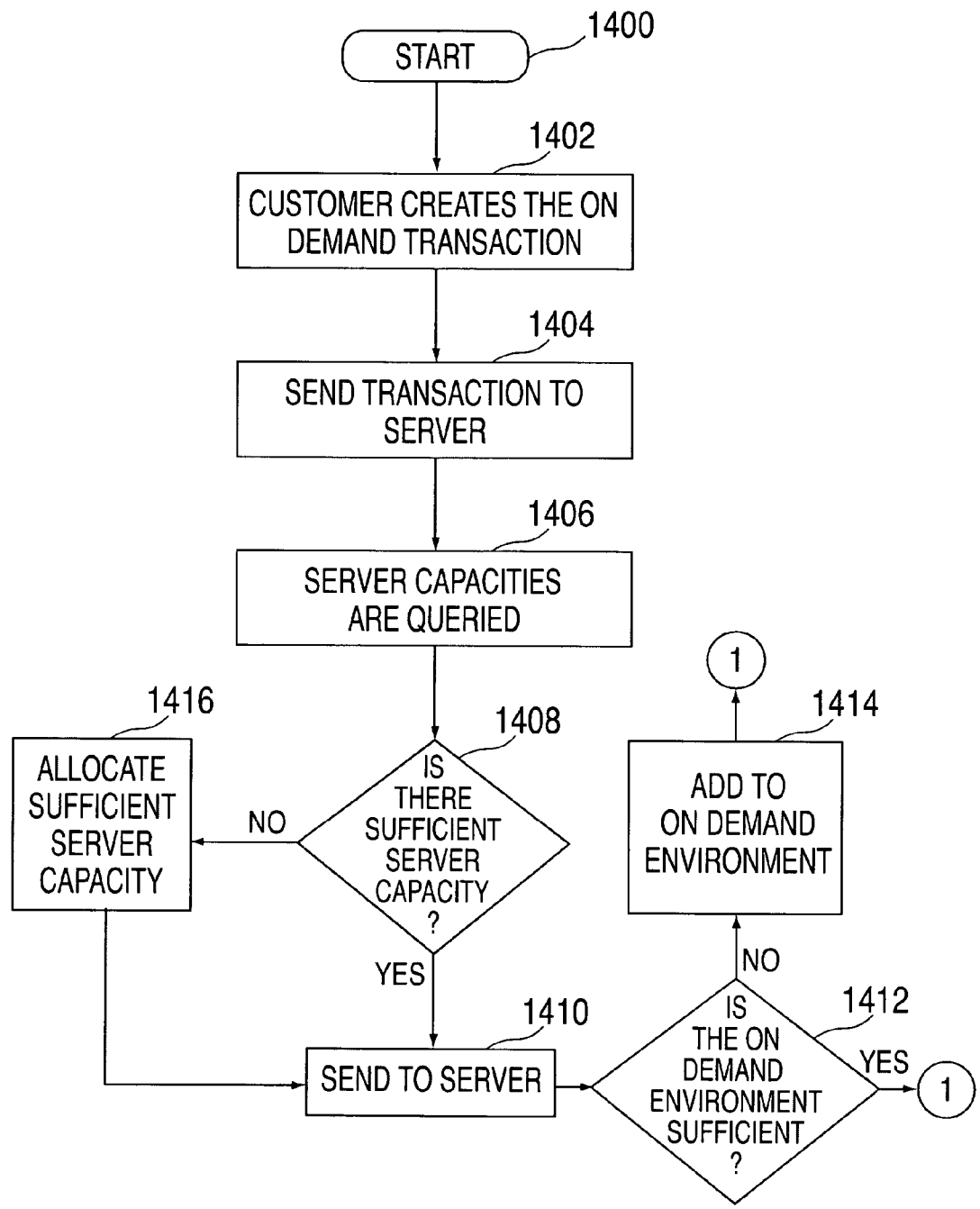
FIGS. 14A and 14B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 14B:
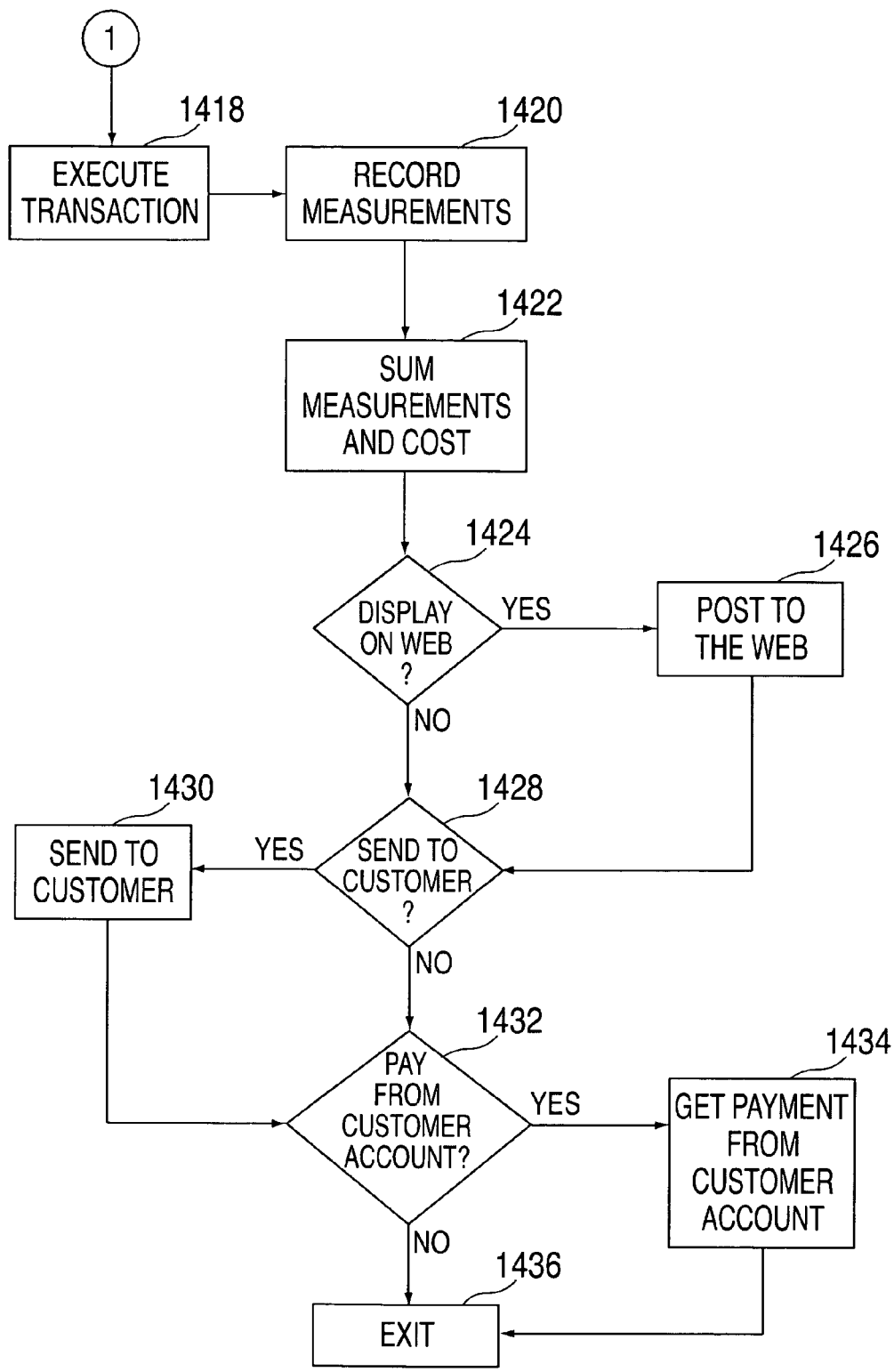

On Demand Computing for Intelligent Team Management System Software. The process software for implementing the intelligent team management system of the present invention may be shared; that is, it may be used to simultaneously serve multiple customers in a flexible, automated fashion. It is process software that is easily standardized, requiring little customization, and it is scalable, thus providing capacity on demand in a pay-as-you-go model known as "on demand" computing. An overview of on demand computing as applied to the intelligent team management system software will now be provided, followed by a more detailed description of same made with reference to the flowcharts of FIGS. 14A and 14B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Aimed with the foregoing overview, the detailed description of the on demand computing with respect to the process software, and the following detailed description of same with reference to FIGS. 14A and 14B where the on demand processes are illustrated, will be more easily understood.

Step 1400 begins the On Demand process. A transaction is created that contains the unique customer identification, the requested service type and any service parameters that further specify the type of service as indicated in step 1402. The transaction is then sent to the main server as shown in step 1404. In an On Demand environment, the main server may initially be the only server. Then, as capacity is consumed, other servers are added to the On Demand environment.

The server central processing unit (CPU) capacities in the On Demand environment are queried at step 1406. The CPU requirement of the transaction is estimated, then the servers' available CPU capacity in the On Demand environment are compared to the transaction CPU requirement to see if there is sufficient CPU available capacity in any server to process the transaction as indicated in step 1408. If there is not sufficient server CPU available capacity, then additional server CPU capacity is allocated to process the transaction as indicated in step 1416. If there was already sufficient available CPU capacity, the transaction is sent to a selected server at step 1410.

Before executing the transaction, a check is made of the remaining On Demand environment to determine if the environment has sufficient available capacity for processing the transaction as indicated at step 1412. This environment capacity consists of elements such as, but not limited to, network bandwidth, processor memory, storage, etc. If there is insufficient available capacity, then capacity will be added to the On Demand environment as indicated in step 1414. Next the required software to process the transaction is accessed, loaded into memory, and the transaction is executed as indicated in step 1418.

The usage measurements are recorded as indicated in step 1420. The usage measurements consist of the portions of those functions in the On Demand environment that are used to process the transaction. The usage of functions such as, but not limited to, network bandwidth, processor memory, storage and CPU cycles are what is recorded. The usage measurements are summed, multiplied by unit costs, and then recorded as a charge to the requesting customer as indicated in step 1422.

If the customer has requested that the On Demand costs be posted to a web site as indicated in step 1424, then they are posted to a web site at step 1426. If the customer has requested that the On Demand costs be sent via e-mail to a customer address as indicated in step 1428, then they are sent to the customer via e-mail as indicated in step 1430. If the customer has requested that the On Demand costs be paid directly from a customer account at step 1432, then payment is received directly from the customer account at step 1434. The On Demand process proceeds to step 1436 and then exits.

As indicated above, the intelligent team management system provides the ability to manage data associated with groups or teams, as well as handle the provisioning of the data to selected teams or team members. The intelligent team management system enables authorized individuals to associate data to the team such that new members will receive designated information (e.g., documents, links, calendar events, training materials, etc.) that is considered relevant to their team. Further, the intelligent team management system enables authorized individuals to determine the manner in which the designated information is added to, and maintained within, a group or team repository.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for implementing intelligent team management services, comprising:
associating selected team member and a team owner with a datastore, the datastore housing content designated as key information and the selected team member designated as an entity, the key information including information designated as relevant to the team members;
creating a distribution list in a messaging application, the distribution list including the selected team member;
searching a content item for terms similar to those found in the datastore;
contacting the team owner to qualify the content item as key;
storing the content item in the datastore as key information upon approval by the team owner in response to the contacting;
providing the selected team member with access to the datastore;
the method further comprising deploying process software for implementing intelligent team management services, said deploying comprising:
installing said process software on at least one server;
identifying server addresses for users accessing said process software on said at least one server;
installing a proxy server if needed;
sending said process software to said at least one server and copying said process software to a file system of said at least one server;
sending the process software to at least a first client computer; and
executing said process software on said first client computer.

2. The method of claim 1, further comprising:
creating a content item by the team owner;
associating the content item created by the team owner with the datastore; and
storing the content item created by the team owner in at least one of:
the datastore; and
a designated storage space, wherein a link to the designated storage space is associated with the content item created by the team owner.

3. The method of claim 1, further comprising:
assigning access control levels to the entity.

4. The method of claim 3, further comprising:
creating a sub-entity; and
assigning access control levels to the sub-entity.

5. The method of claim 1, further comprising:
providing the team owner, via a user interface, an option to automatically notify a team member of the entity of the key information;
wherein providing the selected team members with access to the content item in the datastore includes providing the team member of the entity with the notification.

6. The method of claim 1, wherein the content item includes at least one of a:
document;
calendar event;
email; and
report.

7. The method of claim 1, further comprising:
creating a key activity document for the entity, the key activity document including a listing of key information, key information links, meetings, and an option to save any of the key information, key information links, and meetings to a calendar.

8. The method of claim 1, wherein the content item is associated with an index of content items.

9. The method of claim 1, wherein said installing said process software further comprises:
- determining if programs will reside on said at least one server when said process software is executed;
- identifying said at least one server that will execute said process software; and
- transferring said process software to storage for said at least one server.

10. The method of claim 1, wherein said sending said process software to said first client computer further includes having said at least one server automatically copy said process software to said first client computer, and running an installation program at said first client computer to install said process software on said first client computer.

11. The method of claim 1, wherein said sending said process software to said first client computer further comprises identifying a user and an address of said first client computer.

12. The method of claim 1, wherein said sending said process software to said first client computer includes sending said process software to at least one directory on said first client computer.

13. The method of claim 1, wherein said sending said process software to said first client computer includes sending said process software to said first client computer via e-mail.

14. The method of claim 1, further comprising integrating process software for implementing intelligent team management services, said integrating comprising:
- determining if said process software will execute on at least one server;
- identifying an address of said at least one server;
- checking said at least one server for operating systems, applications, and version numbers for validation with said process software, and identifying any missing software applications for said at least one server that are required for integration;
- updating said at least one server with respect to any operating system and application that is not validated for said process software, and providing any of said missing software applications for said at least one server required for said integration;
- identifying client addresses and checking client computers for operating systems, applications, and version numbers for validation with said process software, and identifying any software applications missing from said client computers that are required for integration;
- updating said client computers with respect to any operating system and application that is not validated for said process software, and providing any missing software application for said client computers required for said integration; and
- installing said process software on said client computers and said at least one server.

15. The method of claim 1, further comprising deploying, accessing, and executing process software for implementing intelligent team management services, said deploying, accessing, and executing process software implemented through a virtual private network, the method further comprising:
- determining if a virtual private network is required;
- checking for remote access to said virtual private network when it is required;
- if said remote access does not exist, identifying a third party provider to provide secure, encrypted connections between a private network and remote users;
- identifying said remote users; and
- setting up a network access server operable for downloading and installing client software on desktop computers for remote access of said virtual private network;
- accessing said process software;
- transporting said process software to at least one remote user's desktop computer; and
- executing said process software on said at least one remote user's desktop computer.

16. The method of claim 15, further comprising:
- determining if said virtual private network has a site-to-site configuration for providing site-to-site access, and if said virtual private network is not so available, installing equipment required to establish a site-to-site configuration for said virtual private network;
- installing large scale encryption into said site-to-site virtual private network; and
- accessing said process software through said site-to-site configuration with large scale encryption.

17. The method of claim 16, wherein said accessing said process software further comprises at least one of:
- dialing into said network access server, and
- attaching directly via a modem into said network access server, said modem being selected from the group of modems consisting of telephone dial-up modems, cable modems, DSL modems, and wireless modems.

18. A method for implementing intelligent team management services, comprising:
- associating selected team members and a team owner with a datastore, the datastore housing content designated as key information and the selected team members designated as an entity, the key information including information designated as relevant to the team members;
- creating a distribution list in a messaging application, the distribution list including the selected team members;
- searching a content item for terms similar to those found in the datastore;
- contacting the team owner to qualify the content item as key information;
- storing the content item in the datastore as key information upon approval by the team owner in response to the contacting; and
- providing the selected team members with access to the content item in the datastore;
- the method further comprising on-demand sharing of process software for implementing intelligent team management services, said on demand sharing comprising:
- creating a transaction containing unique customer identification, requested service type, and service parameters;
- sending said transaction to at least one main server;
- querying said at least one main server about processing capacity associated with said at least one main server to help ensure availability of adequate resources for processing of said transaction; and
- allocating additional processing capacity when additional capacity appears needed to process said transaction, said additional processing capacity being selected from the group of additional capacities consisting of central processing unit capacity, processor memory capacity, network bandwidth capacity, and storage capacity.

19. The method of claim 18, further comprising recording a plurality of usage measurements selected from the group of usage measurements consisting of network bandwidth, processor memory, storage, and central processing unit cycles.

20. The method of claim 19, further comprising:
- summing said usage measurements;
- acquiring at least one multiplicative value associated with said usage measurements and with unit costs; and recording any such acquired multiplicative value as an on demand charge to a requesting customer.

21. The method of claim 20, further comprising at least one of:
posting said on demand charge on a web site if requested by said requesting customer; and
sending said on demand charge via e-mail to said requesting customer's e-mail address.

22. The method of claim 20, further comprising charging said on demand charge to said requesting customer's account if an account exists and if said requesting customer has selected a charge account payment method.

23. A storage device encoded with machine-readable program code for implementing intelligent team management services, the program code including instructions for causing a host system to implement a method comprising:
associating selected team members and a team owner with a datastore, the datastore housing content designated as key information and the selected team members designated as an entity, the key information including information designated as relevant to the team members;
creating a distribution list in a messaging application, the distribution list including the selected team members;
searching a content item for terms similar to those found in the datastore;
contacting the team owner to qualify the content item as key information;
storing the content item in the datastore as key information upon approval by the team owner in response to the contacting; and
providing the selected team members with access to the content item in the datastore;
the storage device further comprising instructions for causing the host system to implement deploying process software for implementing intelligent team management services, said deploying comprising:
installing said process software on at least one server;
identifying server addresses for users accessing said process software on said at least one server;
installing a proxy server if needed;
sending said process software to said at least one server and copying said process software to a file system of said at least one server;
sending the process software to at least a first client computer; and
executing said process software on said first client computer.

24. The storage medium of claim 23, further comprising instructions for causing the host system to implement:
creating a content item by the team owner;
associating the content item created by the team owner with the datastore; and
storing the content item created by the team owner in at least one of:
the datastore; and
a designated storage space, wherein a link to the designated storage space is associated with the content item created by the team owner.

25. The storage medium of claim 23, further comprising instructions for causing the host system to implement:
assigning access control levels to the entity.

26. The storage medium of claim 25, further comprising instructions for causing the host system to implement:
creating a sub-entity; and
assigning access control levels to the sub-entity.

27. The storage medium of claim 23, further comprising instructions for causing the host system to implement:
providing the team owner, via a user interface, an option to automatically notify a team member of the entity of the key information;
wherein providing the selected team members with access to the content item in the datastore includes providing the team member of the entity with the notification.

28. The storage medium of claim 23, wherein the content item includes at least one of a:
document;
calendar event;
email; and
report.

29. The storage medium of claim 23, further comprising instructions for causing the host system to implement:
creating a key activity document for the entity, the key activity document including a listing of key information, key information links, meetings, and an option to save any of the key information, key information links, and meetings to a calendar.

30. The storage medium of claim 23, wherein the content item is associated with an index of content items.

31. The storage medium of claim 23, wherein said installing said process software further comprises:
determining if programs will reside on said at least one server when said process software is executed;
identifying said at least one server that will execute said process software; and
transferring said process software to storage for said at least one server.

32. The storage medium of claim 23, wherein said sending said process software to said first client computer further includes having said at least one server automatically copy said process software to said first client computer, and running an installation program at said first client computer to install said process software on said first client computer.

33. The storage medium of claim 23, wherein said sending said process software to said first client computer further comprises identifying a user and an address of said first client computer.

34. The storage medium of claim 23, wherein said sending said process software to said first client computer includes sending said process software to at least one directory on said first client computer.

35. The storage medium of claim 23, wherein said sending said process software to said first client computer includes sending said process software to said first client computer via e-mail.

36. The storage medium of claim 23, further comprising instructions for causing the host system to implement integrating process software for implementing intelligent team management services, said integrating comprising:
determining if said process software will execute on at least one server;
identifying an address of said at least one server;
checking said at least one server for operating systems, applications, and version numbers for validation with said process software, and identifying any missing software applications for said at least one server that are required for integration;
updating said at least one server with respect to any operating system and application that is not validated for said process software, and providing any of said missing software applications for said at least one server required for said integration;
identifying client addresses and checking client computers for operating systems, applications, and version numbers for validation with said process software, and identifying any software applications missing from said client computers that are required for integration;

updating said client computers with respect to any operating system and application that is not validated for said process software, and providing any missing software application for said client computers required for said integration; and installing said process software on said client computers and said at least one server.

37. The storage medium of claim 23, further comprising instructions for causing the host system to implement on-demand sharing of process software for implementing intelligent team management services, said on demand sharing comprising:

creating a transaction containing unique customer identification, requested service type, and service parameters;

sending said transaction to at least one main server;

querying said at least one main server about processing capacity associated with said at least one main server to help ensure availability of adequate resources for processing of said transaction; and allocating additional processing capacity when additional capacity appears needed to process said transaction, said additional processing capacity being selected from the group of additional capacities consisting of central processing unit capacity, processor memory capacity, network bandwidth capacity, and storage capacity.

38. The storage medium of claim 37, further comprising instructions for causing the host system to implement recording a plurality of usage measurements selected from the group of usage measurements consisting of network bandwidth, processor memory, storage, and central processing unit cycles.

39. The storage medium of claim 38, further comprising instructions for causing the host system to implement:

summing said usage measurements;

acquiring at least one multiplicative value associated with said usage measurements and with unit costs; and recording any such acquired multiplicative value as an on demand charge to a requesting customer.

40. The storage medium of claim 39, further comprising instructions for causing the host system to implement at least one of:

posting said on demand charge on a web site if requested by said requesting customer; and sending said on demand charge via e-mail to said requesting customer's e-mail address.

41. The storage medium of claim 39, further comprising instructions for causing the host system to implement charging said on demand charge to said requesting customer's account if an account exists and if said requesting customer has selected a charge account payment method.

42. The storage medium of claim 23, further comprising instructions for causing the host system to implement deploying, accessing, and executing process software for implementing intelligent team management services, said deploying, accessing, and executing process software implemented through a virtual private network, the method further comprising:

determining if a virtual private network is required;

checking for remote access to said virtual private network when it is required;

if said remote access does not exist, identifying a third party provider to provide secure, encrypted connections between a private network and remote users;

identifying said remote users; and setting up a network access server operable for downloading and installing client software on desktop computers for remote access of said virtual private network;

accessing said process software;

transporting said process software to at least one remote user's desktop computer; and executing said process software on said at least one remote user's desktop computer.

43. The storage medium of claim 42, further comprising instructions for causing the host system to implement:

determining if said virtual private network has a site-to-site configuration for providing site-to-site access, and if said virtual private network is not so available, installing equipment required to establish a site-to-site configuration for said virtual private network;

installing large scale encryption into said site-to-site virtual private network; and accessing said process software through said site-to-site configuration with large scale encryption.

44. The storage medium of claim 43, wherein said accessing said process software further comprises at least one of:

dialing into said network access server, and attaching directly via a modem into said network access server, said modem being selected from the group of modems consisting of telephone dial-up modems, cable modems, DSL modems, and wireless modems.

* * * * *